US009785198B2

(12) United States Patent
Grinstead et al.

(10) Patent No.: US 9,785,198 B2
(45) Date of Patent: Oct. 10, 2017

(54) HINGE CONFIGURATION FOR AN ELECTRONIC DEVICE

(71) Applicant: Intel Corporation, Santa Clara, CA (US)

(72) Inventors: Marshall Grinstead, Mountain View, CA (US); Stephen D. Berry, Beaverton, OR (US); Gabriel G. Khouri, San Jose, CA (US); Tommy S. Montoya, Portland, OR (US); Russell S. Aoki, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 14/316,737

(22) Filed: Jun. 26, 2014

(65) Prior Publication Data

US 2015/0378399 A1 Dec. 31, 2015

(51) Int. Cl.
*G06F 1/16* (2006.01)

(52) U.S. Cl.
CPC .......... *G06F 1/1681* (2013.01); *G06F 1/1632* (2013.01); *G06F 1/1679* (2013.01); *G06F 1/1683* (2013.01)

(58) Field of Classification Search
CPC ..... G06F 1/1654; G06F 1/1681; G06F 1/1683
USPC .................................................. 361/679.29
See application file for complete search history.

(56) References Cited

U.S. PATENT DOCUMENTS

| 5,829,987 | A | * | 11/1998 | Fritsch | ............... | H01R 13/7037 |
|---|---|---|---|---|---|---|
| | | | | | | 200/51.09 |
| 6,932,517 | B2 | * | 8/2005 | Swayze | .................. | H01R 13/71 |
| | | | | | | 385/62 |
| 7,543,997 | B1 | * | 6/2009 | McColloch | .......... | G02B 6/4201 |
| | | | | | | 385/88 |
| 2004/0209489 | A1 | * | 10/2004 | Clapper | ............. | H01R 13/6205 |
| | | | | | | 439/39 |
| 2006/0198094 | A1 | * | 9/2006 | Kano | ........................ | G06F 1/16 |
| | | | | | | 361/679.09 |
| 2007/0072443 | A1 | * | 3/2007 | Rohrbach | .......... | H01R 13/6205 |
| | | | | | | 439/39 |

(Continued)

FOREIGN PATENT DOCUMENTS

| WO | 2008115931 A1 | 9/2008 |
|---|---|---|
| WO | 2015199860 A1 | 12/2015 |

OTHER PUBLICATIONS

International Search Report and Written Opinion in International Application No. PCT/US2015/032426 mailed Jul. 21, 2015.

*Primary Examiner* — Adrian S Wilson
(74) *Attorney, Agent, or Firm* — Patent Capital Group

(57) ABSTRACT

Particular embodiments described herein provide for an electronic device, such as a notebook computer or laptop, that includes a circuit board coupled to a plurality of electronic components (which includes any type of components, elements, circuitry, etc.). The electronic device may also include a hinge assembly to secure a first housing of the electronic device to a second housing. The hinge assembly is to allow for electrical signals to pass between the first housing and the second housing and for a rotation of the first housing in relation to the second housing. The hinge assembly may include a plurality of discs to receive a plurality of segments of the accessory as the hinge assembly engages to secure the first housing to the second housing.

26 Claims, 16 Drawing Sheets

(56) References Cited

U.S. PATENT DOCUMENTS

| | | | |
|---|---|---|---|
| 2007/0236174 A1* | 10/2007 | Kaye | H02J 7/025 320/112 |
| 2008/0129953 A1* | 6/2008 | Blum | G02C 5/143 351/153 |
| 2008/0232061 A1* | 9/2008 | Wang | G06F 1/1632 361/679.41 |
| 2009/0141439 A1* | 6/2009 | Moser | G06F 1/1616 361/679.29 |
| 2011/0199726 A1* | 8/2011 | Moser | G06F 1/1654 361/679.09 |
| 2012/0155005 A1* | 6/2012 | Lee | G06F 1/1698 361/679.26 |
| 2013/0021734 A1 | 1/2013 | Singhal | |
| 2013/0031289 A1 | 1/2013 | Yeh et al. | |
| 2013/0077812 A1* | 3/2013 | Kishinami | H04M 1/0212 381/334 |
| 2013/0229760 A1 | 9/2013 | Whitt et al. | |
| 2014/0043745 A1* | 2/2014 | McCormack | G06F 13/00 361/679.09 |
| 2014/0098474 A1* | 4/2014 | Bhowmik | G06F 1/1616 361/679.01 |
| 2014/0169853 A1 | 6/2014 | Sharma et al. | |
| 2015/0277491 A1* | 10/2015 | Browning | G06F 1/1632 361/679.44 |

\* cited by examiner

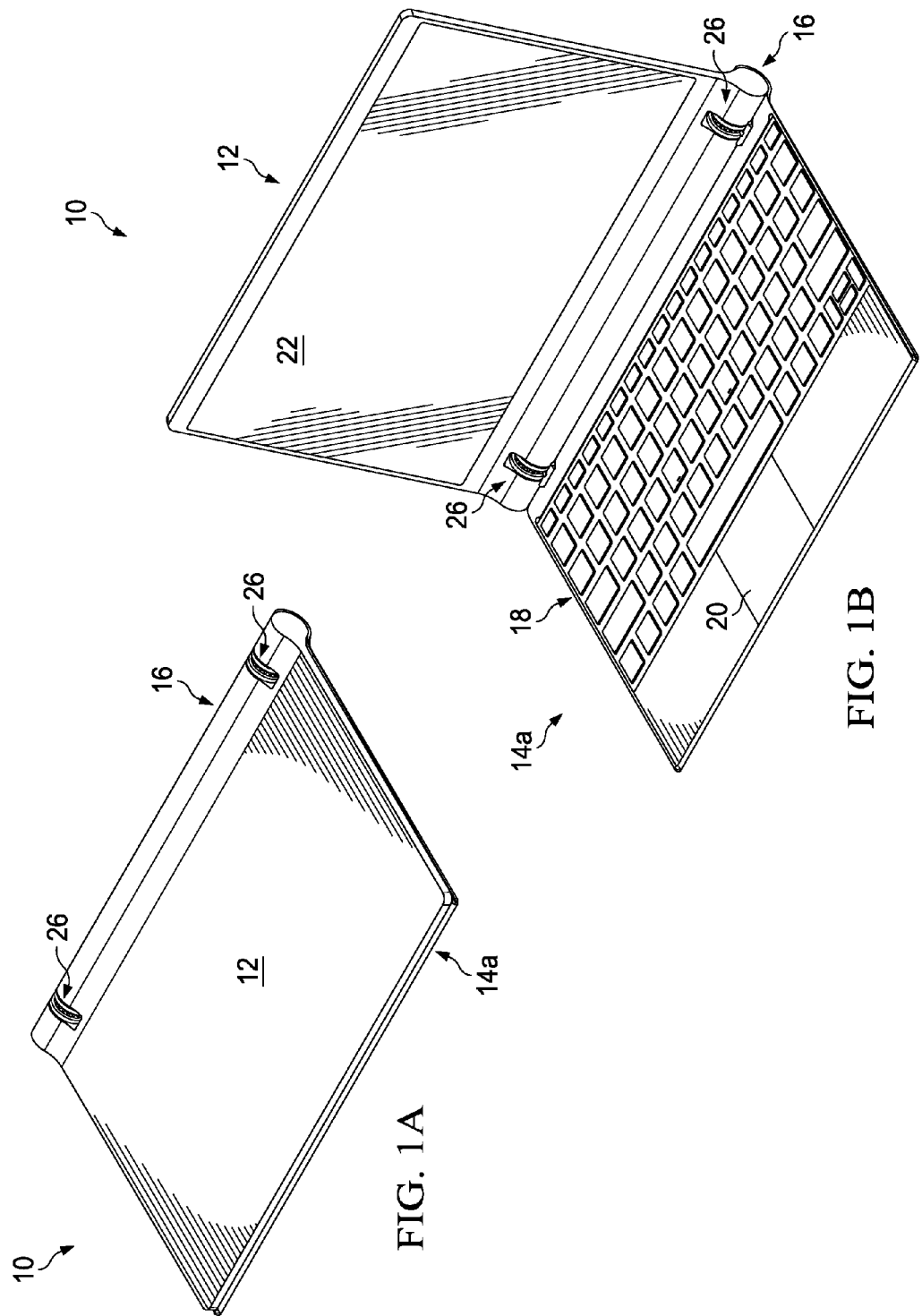

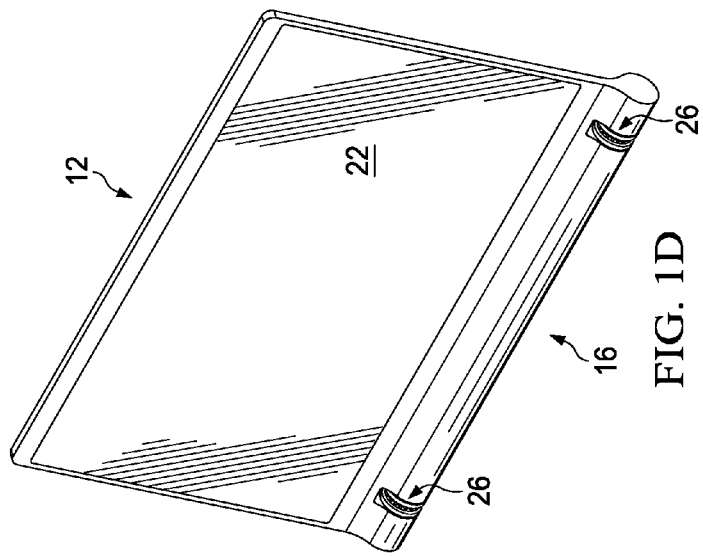
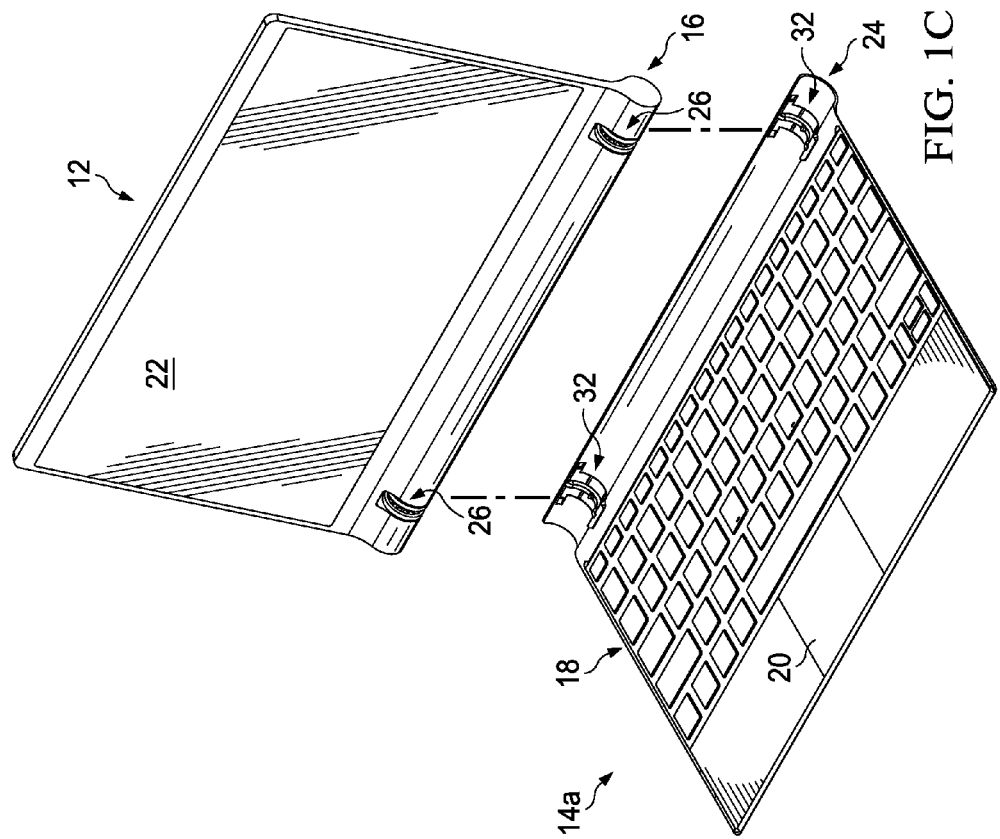

HINGE CONFIGURATION FOR AN ELECTRONIC DEVICE

TECHNICAL FIELD

Embodiments described herein generally relate to hinge configurations for an electronic device.

BRIEF DESCRIPTION OF THE DRAWINGS

Embodiments are illustrated by way of example and not by way of limitation in the FIGURES of the accompanying drawings, in which like references indicate similar elements and in which:

FIG. 1A is a simplified schematic diagram illustrating an orthographic view of an embodiment of an electronic device in a closed configuration, in accordance with one embodiment of the present disclosure;

FIG. 1B is a simplified schematic diagram illustrating an orthographic view of an embodiment of an electronic device, in an open configuration in accordance with one embodiment of the present disclosure;

FIG. 1C is a simplified schematic diagram illustrating an orthographic view of an embodiment of an electronic device in a detached configuration, in accordance with one embodiment of the present disclosure;

FIG. 1D is a simplified schematic diagram illustrating an orthographic view of an embodiment of an electronic device in a standalone configuration, in accordance with one embodiment of the present disclosure;

Figure 2:
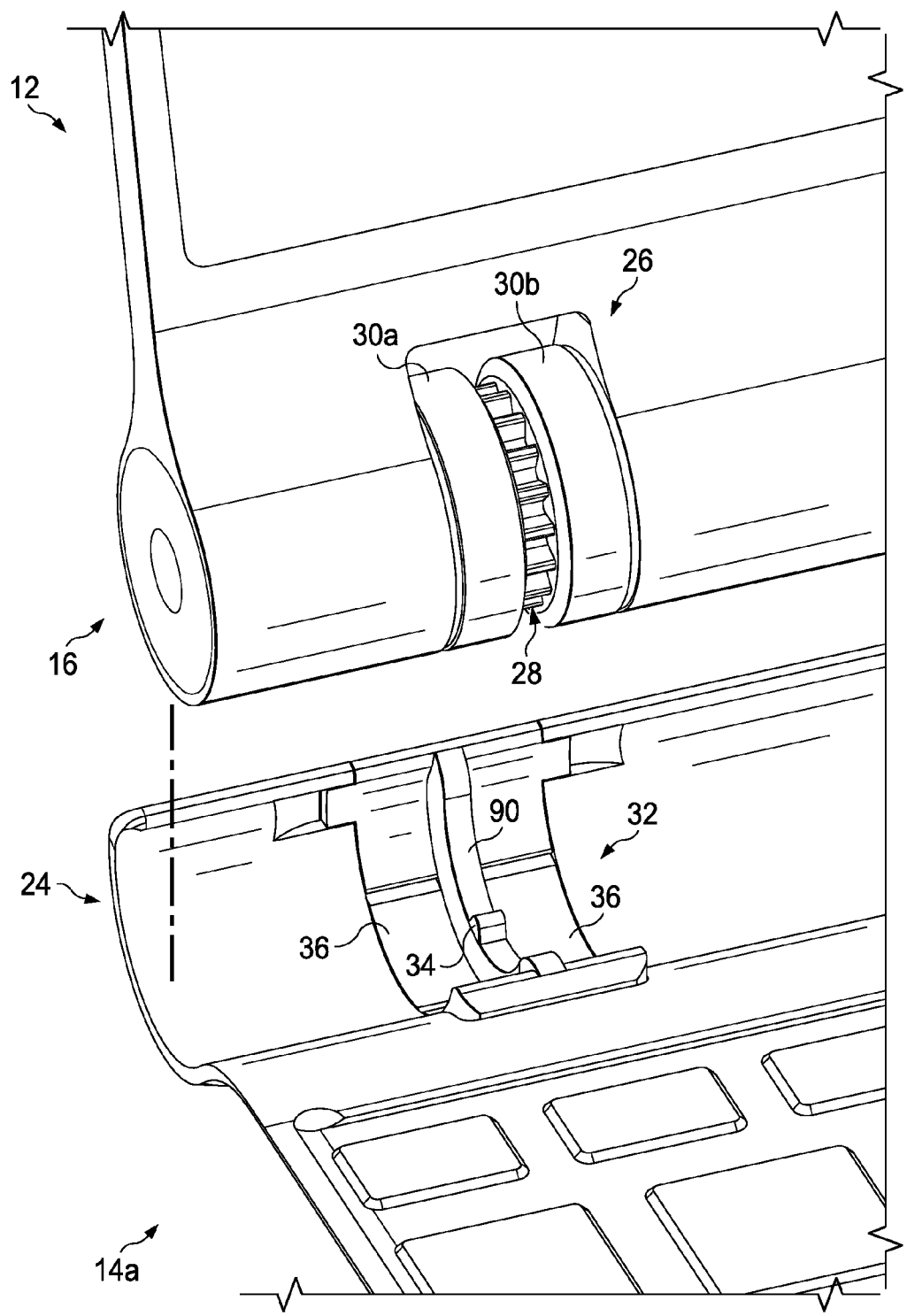
FIG. 2 is a simplified schematic diagram illustrating an orthographic view of a portion of an electronic device, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to hinge configurations for an electronic device. Features such as structure(s), function(s), and/or characteristic(s), for example, are described with reference to one embodiment as a matter of convenience; various embodiments may be implemented with any suitable one or more of the described features.

Traditionally, tablet devices and their associated accessories exist with minimal integration. A keyboard accessory, for example, is often an afterthought that requires a combination of elastic and/or magnets to connect the two disparate components having no power integration between them (e.g., no power integration between a tablet and a keyboard accessory). Docking the first housing to the second housing can provide a limited range of motion for angling the first housing in a laptop usage orientation, or only provide fixed angular orientations. In addition, the second housing interaction may only allow one orientation of the second housing to the first housing when connected (i.e., the device screen only faces the keyboard). This configuration stifles the user's flexibility, along with hindering the overall user experience of the first housing during laptop configuration usage. Often times, a user of a tablet, desires a mechanical keyboard for easier typing or some other attachment. One solution is a detachable keyboard or other attachment that users can snap on to the tablet when needed and left behind when not needed.

However, in one specific embodiment, there can be issues in the design of a detachable keyboard accessory or some other attachment. One issue is that the keyboard must attach firmly enough to prevent accidental detachment, but loosely enough that the user can separate the keyboard with ease. Another issue is that the keyboard and tablet must open and close like a clamshell to provide an adjustable viewing angle, and the rotation resistance cannot be too firm or too light. Also, the keyboard must have a means of electrical communication with the tablet. In addition, some keyboard accessories often have unsightly docking hardware, and sometimes they communicate with tablets wirelessly. A wireless connection such as Bluetooth® reduces the battery life of the tablet and necessitates a separate battery in the accessory, which users must remember to charge independently.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment many have different advantages, and no particular advantage is necessarily required of any embodiment.

Particular embodiments described herein provide for an electronic device, such as a notebook computer, laptop, cellphone, or other mobile device that includes a circuit board coupled to a plurality of electronic components (which includes any type of components, elements, circuitry, etc.). The electronic device may also include a first housing and a second housing coupled to the first housing at a hinge configured such that the first housing and the second housing can rotate between an open configuration of the electronic device and a closed configuration of the electronic device (and hold positions with respect to one another at points in between open and closed). Certain embodiments presented herein can offer an effective hinge and docking capability that provides an orientation flexibility and connection to enable a more extensive integration between the first housing (e.g., a tablet) and the second housing or an accessory (e.g., a keyboard, audio system, a movie player system, a docking station, accessory cover, etc.). The electronic device may also include a hinge assembly to selectively secure (e.g., based on a desired configuration) the first housing of the electronic device to the second housing or accessory.

One or more disks or round hinge mechanisms can be embedded in the first housing. The disks each consist of a metal sprocket and two ferromagnetic rings. The ferromagnetic rings attach to magnets in the second housing to provide a secure but detachable mechanical and electrical interlock. A sprocket in the disk can mate with a protruding tooth on the second housing and an internal friction hinge (e.g., torque engine) in the disk can provide precise torque resistance. The ferromagnetic rings can make surface contact with electrical terminals on both the first housing and the second housing to provide electrical pathways for communication between the two.

The hinge assembly can be configured to allow for rotation of the first housing in relation to the second housing. In an embodiment, the hinge assembly includes one or more discs to receive one or more segments of the second housing to secure the first housing of the electronic device to the second housing. In more particular embodiments, the hinge assembly includes a disc-toothed wheel to receive one or a plurality of segments of the second housing in order to secure the first housing to second housing. Additionally, the second housing may include one or more rib segments to provide an alignment function as the hinge assembly of the first housing engages the second housing (providing increased strength and stiffness to this area of the second housing). In an embodiment that includes magnets in this particular region of the second housing, these rib segments can provide the additional function of focusing the magnetic force of the magnets. In addition, the second housing may include one tooth (or a plurality of teeth features) to provide resistance to a rotational motion between the first housing and the second housing, allowing them to hold their relative positions without user interaction. Further, the second housing may include one or more magnetic bands that attract one or more rings provided in the first housing.

In an embodiment, the docking features of the second housing do not include magnets. Instead, the first housing can be retained by the second housing at the hinge connection point by a hinge assembly with an over center (or other type of) mechanical snap retention. The hinge assembly can be configured to allow a rotation of the first housing in relation to the second housing and the hinge assembly can include a snap configuration that to provides a retention force with the first housing and the second housing. Power signals and electrical pathways can be through the snap configuration. Alternatively, the power signals and electrical pathways can be run through a middle piece of the snap configuration and two outer pieces of the snap configuration can be insulators. The second housing can be a keyboard that includes a keyboard side snap with one piece and can be provided to allow an independent motion.

In one example, the hinge assembly can include a ferromagnetic ring, a sprocket, and a torque engine inserted onto a shaft and a steel housing. The torque engine may rely on spring tension and the total rotating friction in the whole assembly can be adjusted by adding more springs or removing them from the torque engine. The shaft coming out of the hinge can be pressed onto a steel assembly that is a combination of the central sprocket and one of a pair of ferromagnetic rings. When the assembly is finished, the sprocket can mate with the second housing and the hinge housing can mate with the first housing. The angular friction between the two parts on the shaft can control the opening and closing of the first housing and the second housing when they are combined.

A second ferromagnetic ring may then be assembled over the hinge. An insulating washer can keep the ring electrically isolated from the rest of the metal in the hinge and allow the two ferromagnetic rings to transfer different electrical signals. The second ferromagnetic ring may not provid any angular support to the first housing, so it can be free-spinning. The second ferromagnetic ring could also be attached to the sprocket through the insulator so that the entire ring/sprocket/ring assembly moves as one unit.

End structures can be slid on and be configured to hold the hinge assembly into the first housing. The end structures may be plastic. One of the end structures can include two spring contacts that are in contact with the free ferromagnetic ring and the hinge housing. The spring contacts can be routed to any part of the first housing to create an electrical pathway to the first housing's main circuit board.

The mating device to the first housing can include a second housing that has a tooth, two magnets, and two spring contacts. When the first housing and the second housing come together, the second housing magnets grab onto the ferromagnetic rings to provide firm attachment while still allowing detachment. The tooth fits into a gap on the sprocket to provide smooth and firm rotational resistance, allowing the first housing to open and close like a laptop and hold its position at any desired viewing angle. The springs on the second housing can make surface contact with the ferromagnetic rings to provide an electrical connection between the second housing and the first housing.

The electronic device can be configured such that the electric current from the inner ferromagnetic ring is routed through the metal hinge architecture itself. This pushes both of electrical traces from the second housing to the same side of the hinge assembly, allowing them to potentially share an electrical route to the main circuit board in the first housing. In addition, both of the internal spring contacts can reside in the space next to the friction hinge. This removes many of the components from the axial stack-up chain, making the design space efficient. In one example, the hinge design can be used to attach a tablet to many other accessories such as a keyboard, a speaker, charging station, external monitor dock, etc.

Hinge Configuration for an Electronic Device

The following detailed description sets forth example embodiments of apparatuses, methods, and systems relating to detection of display rotation mechanisms or devices for an electronic device. Features such as structure(s), function(s), and/or characteristic(s), for example, are described with reference to one embodiment as a matter of convenience; various embodiments may be implemented with any suitable one or more of the described features.

FIG. 1A is a simplified orthographic view illustrating an embodiment of an electronic device 10 in a closed clamshell configuration in accordance with one embodiment of the present disclosure. Electronic device 10 may include a first housing 12, a second housing 14a, and a hinge 16. Hinge 16 can define an axis of rotation (or multiple axes of rotation) that is shared between first housing 12 and second housing 14a. In one or more embodiments, electronic device 10 may be any suitable electronic device having a display such as a mobile device, a tablet computer and/or a tablet device (e.g., iPad), a personal digital assistant (PDA), a smartphone, an audio system, a movie player of any type, a computer docking station, etc. First housing 12 may also be any suitable electronic device having a display and can be attached to a tablet to many other accessories such as a keyboard, a speaker, charging station, etc. For example, first housing 12 may be a mobile device, a tablet computer and/or a tablet device (e.g., iPad), a personal digital assistant (PDA), a smartphone, an audio system, a movie player of any type, etc.

Hinge 16 can include one or more discs 26 that enable an integrated detachable accessory solution from mechanical, electrical, and aesthetical standpoints. Using hinge 16, electrical current and signals can be passed between first housing 12 and second housing 14a to recharge an on-board battery or capacitor, power any number of items (e.g., display, a wireless module, a camera, speakers, etc.), and provide a communication path between first housing 12 and second housing 14a.

Turning to FIG. 1B, FIG. 1B is a simplified orthographic view illustrating electronic device 10 in an open clamshell configuration, in accordance with one embodiment of the present disclosure. First housing 12 can include a display 22. In an embodiment, second housing 14a can include a keyboard 18 and a touchpad 20. Display 22 may be disposed within/on and/or supported by first housing 12. In one or more embodiments, display 22 is a screen that can be a liquid crystal display (LCD) display screen, a light-emitting diode (LED) display screen, an organic light-emitting diode (OLED) display screen, a plasma display screen, or any other suitable display screen system.

In one or more embodiments, second housing 14a can function as an input device and may include a mechanical keyboard, touch screen, input area, etc. The touch screen can detect the presence and location of a touch within the touch screen area. In one example, the touch screen can be configured to allow for the input of letters, numbers, characters, functions, etc. similar to a mechanical keyboard and the touch screen may be used in place of (or instead of) a mechanical keyboard.

In a particular embodiment, touchpad 20 is a pointing device that features a tactile sensor or a specialized surface that can translate the motion and position of a user's fingers to a relative position on display 22. Touchpad 20 can be used in place of a mouse (e.g., where desk space is scarce or based on user preference). Touchpad 20 can operate using capacitive sensing, conductance sensing, or any other appropriate sensing technology. In a particular embodiment, a suitable battery can be provisioned proximate to touchpad 20 in order to power its operations. In addition, the surface of display 22 can be a touch display.

Turning to FIG. 1C, FIG. 1C is a simplified orthographic view illustrating electronic device 10 in detached configuration. As illustrated in FIG. 1C, first housing 12 has been removed from second housing 14a. Hinge channel 24 can include a disk groove 32 to accommodate one or more disks 26. Turning to FIG. 1D, FIG. 1D is a simplified orthographic view illustrating first housing 12 in a tablet configuration. In the tablet configuration, first housing 12 may be a standalone electronic device. In one or more embodiments, electronic device 10 is a notebook computer or laptop computer.

In one example embodiment, a motherboard of first housing 12 is a general circuit board that can hold various components of the internal electronic system of first housing 12. The components may include a central processing unit (CPU), a memory, etc. The motherboard can also couple to one or more connectors in order to accommodate other peripherals (e.g., second housing 14a) sought to be used by a user of first housing 12. More specifically, the motherboard can provide the electrical connections by which the other components of the system can communicate.

Any processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

In operation, when electronic device 10 is in a closed clamshell configuration, as is illustrated in FIG. 1A, second housing 14a can protect display 22. When first housing 12 is flipped up to an open position, electronic device 10 operates in a traditional laptop orientation (i.e., a keyboard resting on a surface with a display held in an upright position). When the display section is flipped upside-down to face outwardly away from the key elements of second housing 14a, electronic device 10 can operate in a tablet configuration with second housing 14a nested behind display 22 and out of the way of user interaction. Its barrel-shaped hinge mechanism feature can serve as a grip for the end user. In this mode, second housing 14a can be stowed behind first housing 12. In the tablet configuration, second housing 14a can still be flipped up. In this mode, second housing 14a can operate as a stand (behind the display), and first housing 12 can become a stationary display (e.g., movie mode). When first housing 12 is detached from second housing 14a, it can function as a simple lightweight tablet by itself.

In the case where second housing 14a of electronic device 10 includes keyboard 18, the main components of keyboard 18 can include various elements. For example, second housing 14a can include a keyboard body reflective of a unibody-molded part that may use insert and/or comolding methods to eliminate visible fasteners. In a particular embodiment, electronic device 10 includes an 18.5 mm pitch full-size keyboard that provides for an optimal touch-typing experience.

For the actual keys, in a particular non-limiting embodiment, the keys are configured with a 0.5 mm travel distance (for individual keys). In addition, tactile feedback can be provided (e.g., 70 gram with "cliff drop" force deflection feel) to mimic the typing experience of traditional keyboards. In certain implementations, there is little (or no) dead space on the key surface. There can be various types of keys on the keyboard, for example, the keyboard can include pivoting keys (e.g., left edge: tilde, tab, caps lock, shift, left ctrl; right edge: backspace, backslash, enter, shift), rocking keys such as the arrow keys, and substantially vertical travel keys such as function keys and other keys that are not along the right or left edge, etc.

Electronic device 10 can also include a nonferrous web that provides sufficient stiffness to the body of second housing 14a. The web can provide a guide for keys to move vertically, but appropriately restrain x-y motion. In addition, a ferrous top plate can increase the stiffness of keyboard 18, retain keys from falling out, and attract magnetic keys to bias them upwards.

In terms of Bluetooth capability, the power can reach a Bluetooth radio by passing current through each one or more disks 26. Second housing 14a can include a Bluetooth radio circuit board. The Bluetooth radio circuit board can have a direct current (DC) rectifier to power the electronics independent of the orientation of first housing 12 (i.e., laptop mode vs. tablet mode, etc.).

In certain example embodiments, the design of electronic device 10 can allow first housing 12 to connect to second housing 14a in various modes such as a laptop type mode, a tablet type mode, a movie stand type mode, etc. The range of viewing angle adjustment can be continuous (e.g., extending between 0 and 125°, or 150°, or more, or different ranges may be provided). 0° can correspond to the fully closed position, whereas 125° or similar can be defined as fully opened.

In addition, second housing 14a may further include insert-molded band features to provide stiffness to the outer portion of the scoop geometry as well as transmit rotational loads, which inhibit first housing 12 from rotating with respect to second housing 14a. Also provided are one or more band features that can provide for a magnetic attraction of the ferrous disc shaped features of first housing 12. Electrical current and signals can be passed from first housing 12 to second housing 14a to allow for communication between first housing 12 and second housing 14a and to recharge an on-board battery or capacitor, or power any number of items (e.g., a Bluetooth radio), and allow for communication between first housing 12 and second housing 14a. Additionally, first housing 12 can be suitably anchored to second housing 14a to prohibit a toothed disc feature from rotating with respect to second housing 14a, while allowing first housing 12 to concentrically rotate in the "scoop" part of second housing 14a through one or more clutch elements in first housing 12.

Magnet components may be accompanied by a suitable backing (e.g., a steel backing) to reduce unwanted stray magnetic fields. Without such a backing, magnetic forces would have an increased likelihood of interaction with other components, alter credit card information, corrupt certain storage elements, etc. The shape of first housing 12 and second housing 14a can allow for a cam-out release of first housing 12 from second housing 14a by using first housing 12 as a lever to overcome the magnetic pull force of the magnetic components. The magnetic pull from second housing 14a to first housing 12 can ensure an electric contact and mechanical connection between second housing 14a and first housing 12. Disk 26, or portions of disk 26, can be electrically isolated from first housing 12 and second housing 14a enclosures to allow positive and negative connections between first housing 12 and second housing 14a made through two or more disks 26. The physical contact of the toothed wheel features of disc 26 to the torque transmission tooth of second housing 14a allows for electrical power and/or signals and data to pass from first housing 12 to second housing 14a. Disc 26 can suitably transmit torque from second housing 14a to first housing 12. Additionally, certain embodiments may use a plastic outer housing to electrically isolate disc 26 from the chassis.

Turning to FIG. 2, FIG. 2 is a simplified schematic diagram illustrating an orthographic view of electronic device 10 being separated into two segments. Hinge 16 can include disk 26. Disk 26 can include a sprocket 28 and magnetic rings 30a and *b*. Hinge channel 24 can include disk groove 32. Disk groove 32 can include a snap band 90 and a magnetic band 36. Snap band 90 can include tooth 34.

Focusing for a moment on the disc clutch, the specific design of electronic device 10 integrates the clutch element that resides inside the volume of the disc features of the electronic device and, further, saves space by incorporating elements of the disc into the clutch. In general, the design and assembly mechanism allows the first housing disc sub-assembly to be installed into a slot enclosure that is smaller in width than the disc sub-assembly in its installed configuration. The actual disc can be designed with an electrical connection that is physically isolated from the chassis of first housing 12. Additionally, electronic device 10 offers a friction clutch integration with a disc-toothed wheel feature in the center (or other location) of the disc features in electronic device 10 (e.g., for improved range of motion, more compact size, position hold capabilities, and better torque transition characteristics).

The magnetic band segments in second housing 14a can attract the ferrous rings of disc 26. The center rib (discussed in detail below) provides an amplified magnetic strength focused into the band. During insertion of first housing 12 into second housing 14a, the center toothed wheel features of disc 26, which are connected to the clutch, engage the tooth at the center of a second housing scope. The center rib of the second housing scoop can serve to provide a suitable alignment lead-in function. The encasing can provide a directional focus for the magnetic field. In a particular embodiment, a clutch with bidirectional uniform torque properties can be provisioned in disc 26. This can allow first housing 12 to be inserted into second housing 14a in either orientation (i.e., display 22 facing keyboard 18 or display 22 facing away from keyboard 18) and, further, provide the uniform resistance to motion. This is in contrast to a typical standard laptop clutch, which may provide less resistance in one direction or variable resistance based on the angle between first housing 12 and second housing 14a. In a particular embodiment, retention of first housing 12 to second housing 14a is achieved through two arc-shaped ferrous steel components that may be embedded with four linearly polarized segment-shaped magnets. Magnets can attract ferrous steel ring bands that are part of the first housing socket modules. In a particular embodiment, angle adjustment and position hold can be achieved by engaging a single tooth built into the second housing socket nest with disc 26. When attached to first housing 12, second housing 14a becomes integrated to allow power and electrical signals (e.g, data) to flow through disk 26 in first housing 12 to second housing 14a, thus, powering second housing 14a (e.g., a Bluetooth radio embedded in a keyboard) and allow for communication between first housing 12 and second housing 14a.

An accessory band design feature can provide mechanical and magnetic lead-in guidance and attraction force for retention during docking. Additionally, electronic device 10 may use a mechanical snap-in feature to attach, retain, and detach any accessory. The power of electronic device 10 can be physically isolated from its chassis and/or, further, it can be integrated within hinge 16. Moreover, electronic device 10 can offer docking that allows power and/or data to flow between first housing 12 and second housing 14a. Electronic device 10 can offer a space saving integration of a clutch or torque mechanism residing inside the volume of disc 26. Further, electronic device 10 can offer an improved range of motion for the display when first housing 12 is oriented in a laptop configuration.

The magnets in second housing 14a may be rare earth magnets that attract discs 26 in first housing 12. The bands can be made from low-carbon steel that helps reduce stray magnetic fields emitting from the underside of second housing 14a. Band support posts can pass through the second housing wall and be pressed into each band in accordance with one embodiment of the present disclosure. This can mechanically connect the bands to second housing 14a and/or to pass electric power and signals from the bands to the internal region (circuitry) of second housing 14a. The band and band magnet assembly can also be insert molded into the plastic second housing body, which helps support the outboard tip of the second housing body.

A single center tooth on the band can mate with a sprocket in disc 26 in first housing 12 to prevent unwanted toothed disc rotation with respect to second housing 14a and, further, allow first housing 12 to be inserted into second housing 14a in both possible orientations. Because the bands touch the electrically live disc 26 of first housing 12, the bands can become electrically charged, so they can be electrically isolated from other metal components of second housing 14a, though proper first housing 12 and second housing 14a electronic circuit design may also be used to eliminate this need.

In certain embodiments, instead of passing power and signals through disk 26, certain configurations can pass power and signals through one or a plurality of discs with wiping contacts on second housing 14a. Other configurations can pass power and signals through disc features that are not necessarily the ferrous features being shown, but any other ring of metal could be used as a contact. This could effectively make the electrical connection and, further, could be used as the sole point of torque transmission between first housing 12 and second housing 14a. Note that such an embodiment is like a scaled-up version of the tooth engaging in the toothed wheel. However, this might not necessarily be ideal in that it may only allow first housing 12 and second housing 14a (or any other accessory) to be connected when they are in one orientation. Virtually any other electrical connection methods could be used and, thus, are clearly within the scope of the present disclosure. Additionally, alternative constructions for the barrel and scoop (which come together at the hinge) could be used without departing from the teachings of present disclosure. Although potentially cumbersome, such configurations represent viable alternative embodiments of the present disclosure.

Figure 3:
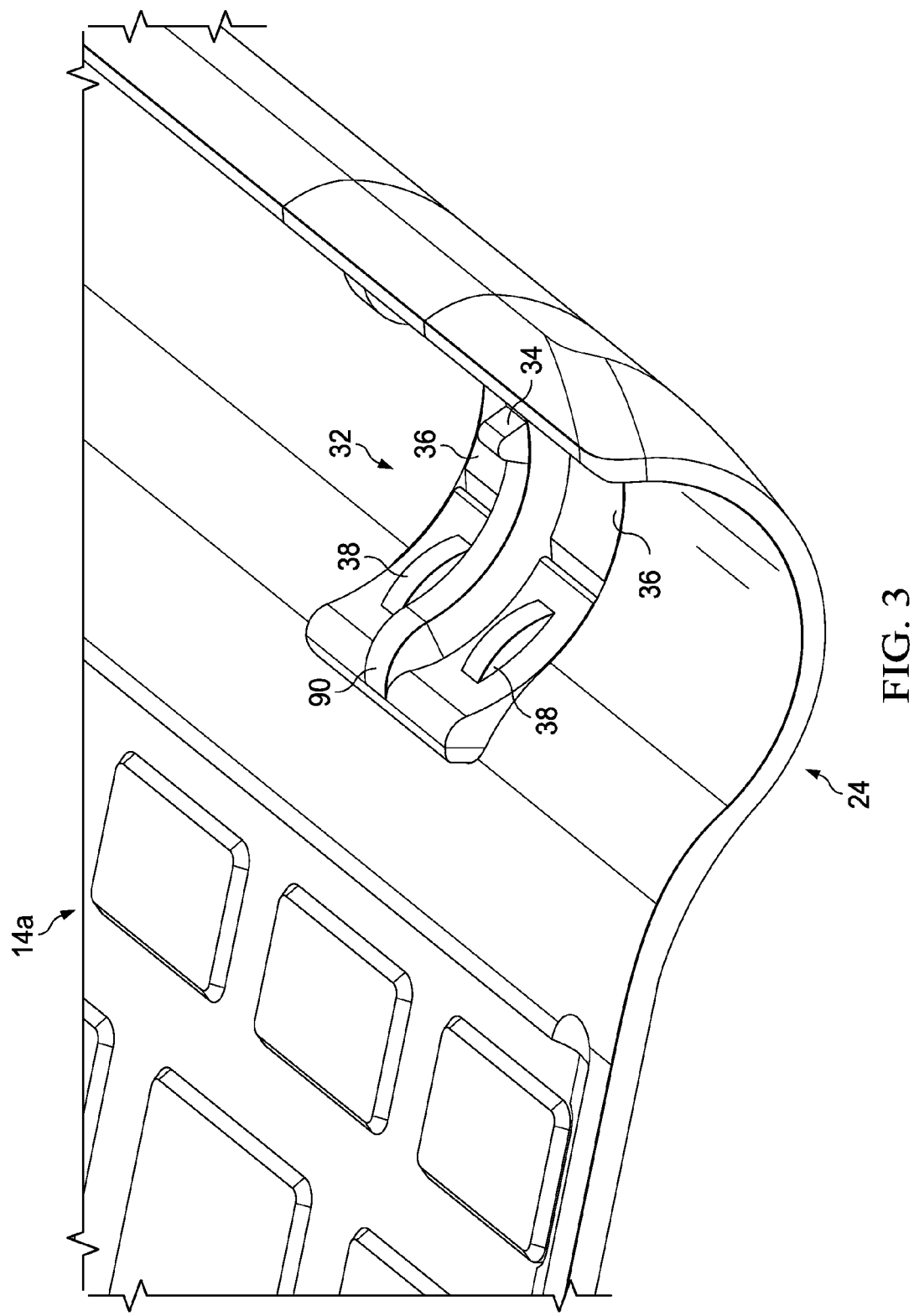
FIG. 3 is a simplified schematic diagram illustrating an orthographic view of an accessory of an electronic device, in accordance with one example implementation.

Turning to FIG. 3, FIG. 3 is a simplified schematic diagram illustrating an orthographic view of a portion of second housing 14a. Disk groove 32 can include tooth 34, magnetic band 36, connecting springs 38, and snap band 90. In this particular embodiment, disc groove 32 can be in the range of 1.0-3.5 millimeters, although alternative embodiments could have any other suitable dimension. Disk groove 32 can be configured to couple to disk 26. Snap band 90 can provide lead in guidance for disk 26. Tooth 34 can mate with a sprocket in disk 26. Connecting springs 38 can couple with magnetic rings on disk 24 to allow for an electrical connection and pathway between first housing 12 and second housing 14a.

Figure 4:
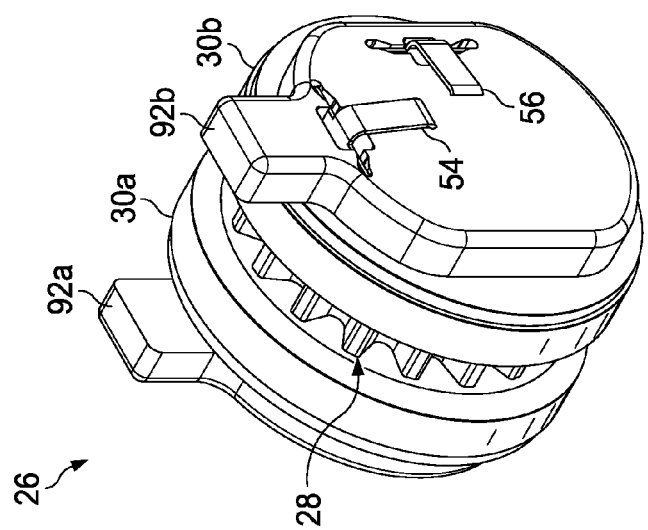
FIG. 4 is a simplified schematic diagram illustrating an orthographic view of a portion of an electronic device, in accordance with one embodiment of the present disclosure.

Turning to FIG. 4, FIG. 4 is a simplified schematic diagram illustrating an orthographic view of a portion of disk 26 in accordance with one example implementation. Disk 26 can include sprocket 28, magnetic rings 30a and b, a first connecting contact 54, and a second connecting contact 56. Sprocket 28 can engage tooth 34. Magnetic rings 30a and b can couple with contact springs 38 to allow for an electrical connection and pathway between first housing 12 and second housing 14a. First connecting contact 54 and second connecting contact 56 can be connected to electrical components in first housing 12.

Figure 5B:
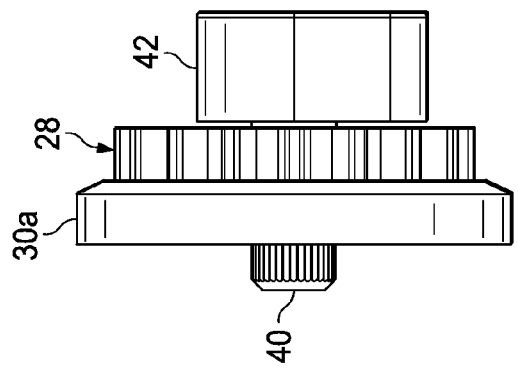
FIG. 5B is a simplified schematic diagram illustrating a side view of a portion of an electronic device, in accordance with one example implementation.
Figure 5A:
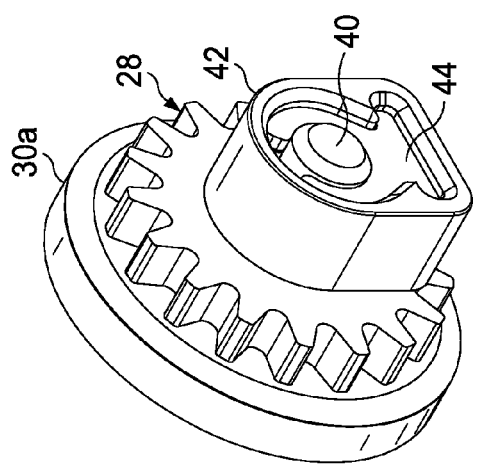
FIG. 5A is a simplified schematic diagram illustrating an orthographic view of a portion of an electronic device, in accordance with one example implementation.

Turning to FIG. 5A, FIG. 5A is a simplified schematic diagram illustrating an orthographic view of a portion of disk 26 in accordance with one example implementation. Disk 26 can include sprocket 28, magnetic ring 30a, a shaft 40, a torque engine 42, and an omega clip 44. Omega clip 44 can help secure torque engine 42 to shaft 40. While omega clip 44 is shown as an omega type clip, other clips, devices, or means can be used to secure torque engine 42 to shaft 40. Turning to FIG. 5B, FIG. 5B is a simplified schematic diagram illustrating a side view of a portion of disk 26 in accordance with one example implementation. Disk 26 can include sprocket 28, magnetic ring 30a, shaft 40, and torque engine 42.

Figure 6C:
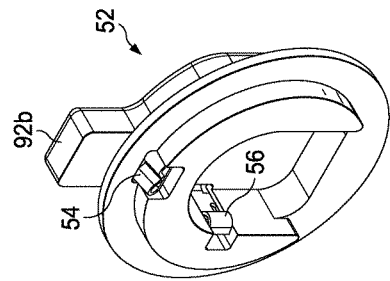
FIG. 6C is a simplified schematic diagram illustrating an orthographic view of a portion of an electronic device, in accordance with one example implementation.
Figure 6B:
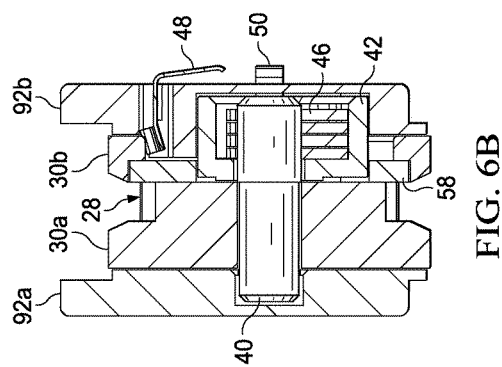
FIG. 6B is a simplified schematic diagram illustrating a side cutaway view of a portion of an electronic device, in accordance with one example implementation.
Figure 6A:
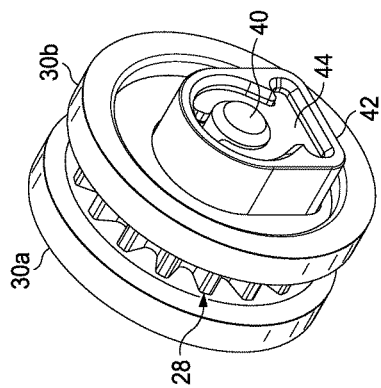
FIG. 6A is a simplified schematic diagram illustrating an orthographic view of a portion of an electronic device, in accordance with one example implementation.

Turning to FIG. 6A, FIG. 6A is a simplified schematic diagram illustrating an orthographic view of a portion of disk 26 in accordance with one example implementation. Disk 26 can include sprocket 28, magnetic ring 30a and b, shaft 40, torque engine 42, and omega clip 44. Turning to FIG. 6B, FIG. 6B is a simplified schematic diagram illustrating a cut away view of a portion of disk 26 in accordance with one example implementation. Disk 26 can include sprocket 28, magnetic ring 30a and b, shaft 40, torque engine 42, a torque mechanism 46, a first spring contact 48, a second spring contact 50, and an insulator 58.

Turning to FIG. 6C, FIG. 6C is a simplified schematic diagram illustrating an orthographic view of a portion of lock housing 52 in accordance with one example implementation. Lock housing 52 can include a first connecting contact 54 and a second connecting contact 56. Lock housing 52 is designed to fit over torque engine 42 such that first spring contact 48 comes into contact with first connecting contact 54 and second spring contact 50 comes into contact with second connecting contact 56.

Figure 7:
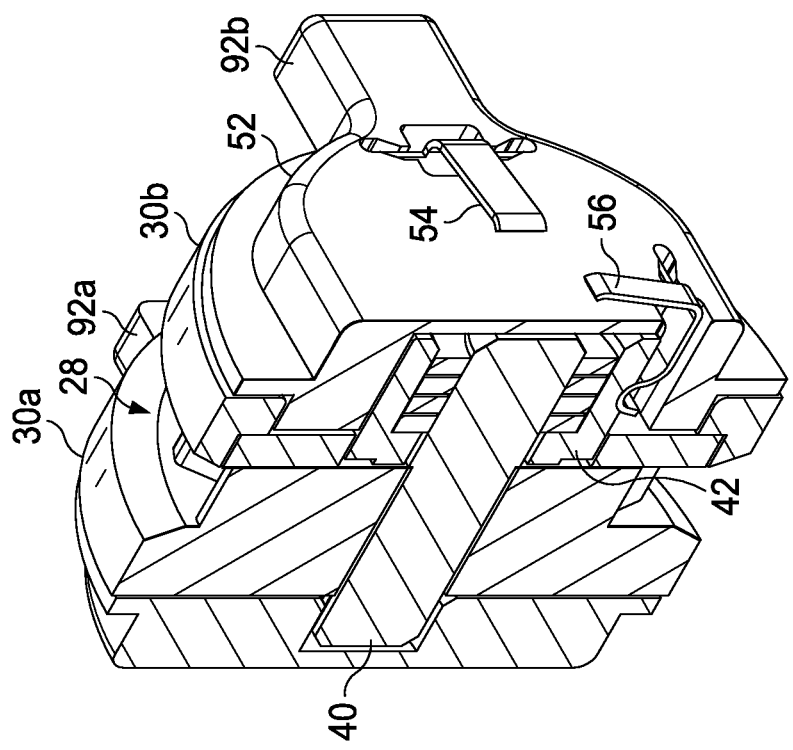
FIG. 7 is a simplified schematic diagram illustrating an orthographic cutaway view of a portion of an electronic device, in accordance with one example implementation.

Turning to FIG. 7, FIG. 7 is a simplified schematic diagram illustrating a cut away view of a portion of disk 26 in accordance with one example implementation. Disk 26 can include sprocket 28, magnetic ring 30a and b, shaft 40, torque engine 42, lock housing 52, first connecting contact 54, second connecting contact 56, and display connections 92a and b. FIG. 7 illustrates the position of disk 26 when electronic device is in a closed clamshell configuration (e.g., as shown in FIG. 1A) Display connections 92a and b can be configured to connect disk 26 to electrical components in first housing 12.

Figure 8:
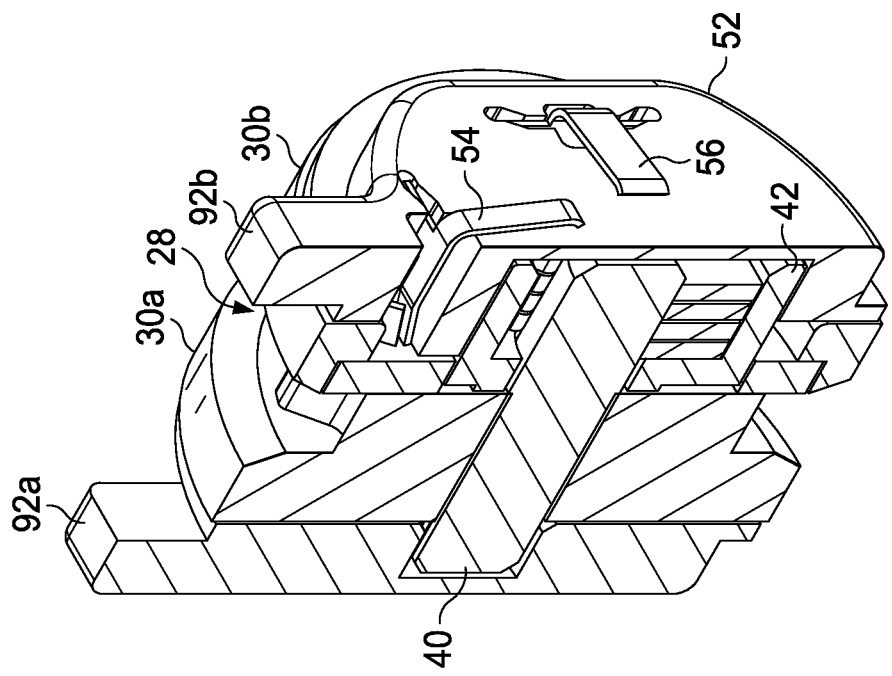
FIG. 8 is a simplified schematic diagram illustrating an orthographic cutaway view of a portion of an electronic device, in accordance with one example implementation.

Turning to FIG. 8, FIG. 8 is a simplified schematic diagram illustrating a cutaway view of a portion of disk 26 in accordance with one example implementation. FIG. 8 illustrates the position of disk 26 when electronic device is in an open configuration (e.g., as shown in FIG. 1B). As shown, torque engine 42, lock housing 52, and display connection 92a and b have rotated around shaft 40.

Figure 9:
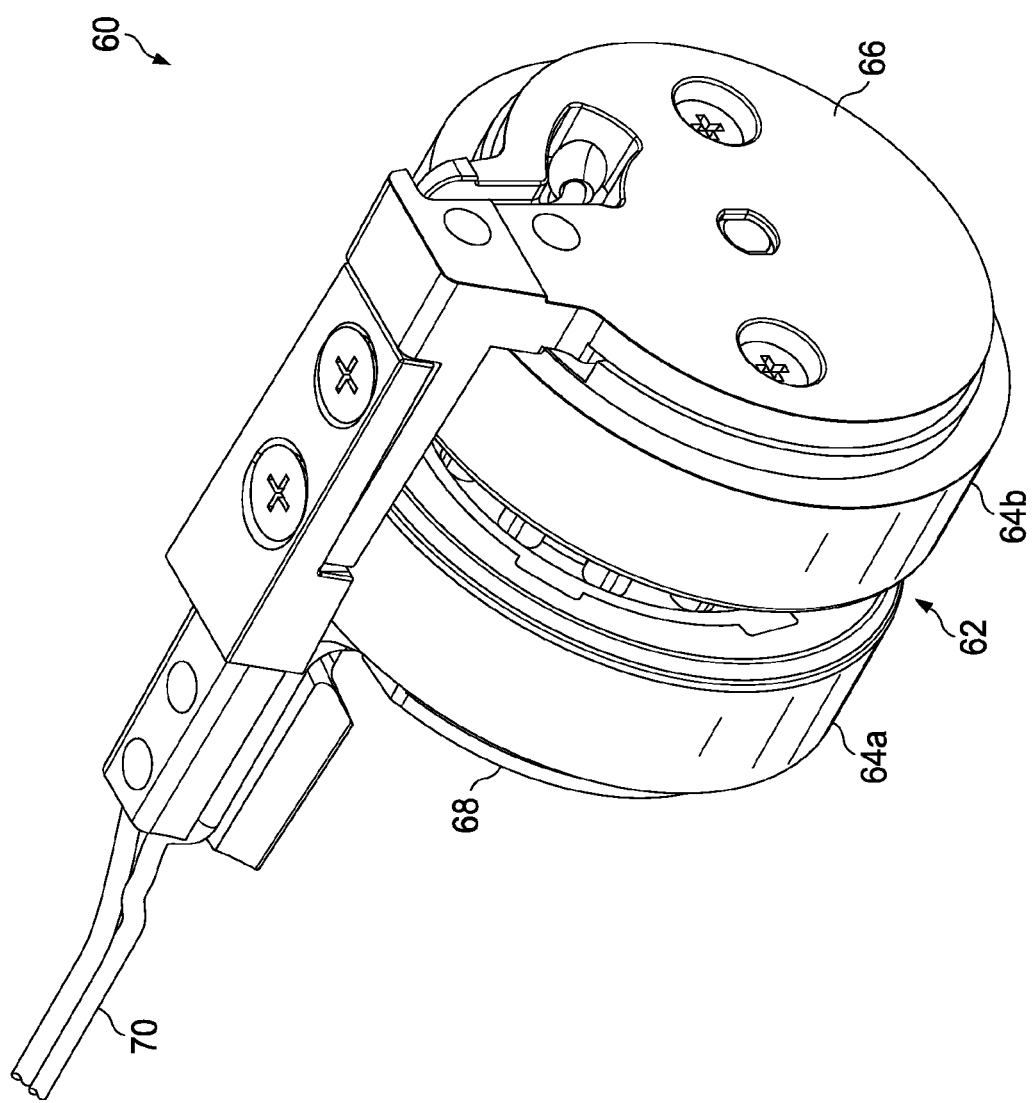
FIG. 9 is a simplified schematic diagram illustrating an orthographic view of a portion of an electronic device, in accordance with one example implementation.

Turning to FIG. 9, FIG. 9 is a simplified schematic diagram illustrating an orthographic view of a pin contact disk 60 in accordance with one example implementation. Pin contact disk 60 can include a second sprocket 62, second magnetic ring 64a and b, a first housing 12, and a second housing 14b. Wires 70 may extend from first housing 66 and second housing 68 and allow for an electrical connection when first housing 12 is connected to second housing 14b.

Figure 10:
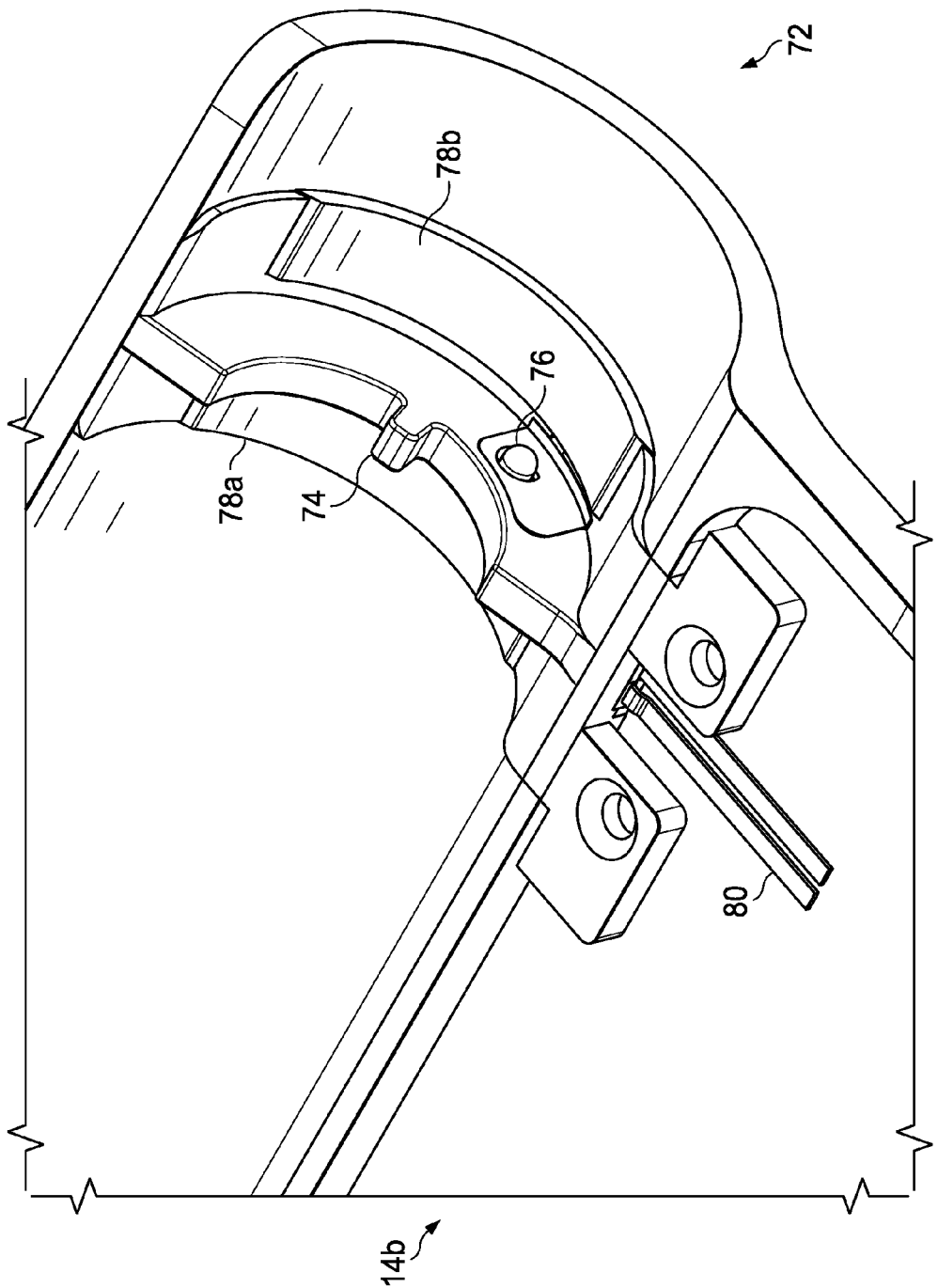
FIG. 10 is a simplified schematic diagram illustrating an orthographic view of an accessory of an electronic device, in accordance with one example implementation.
Figure 11:
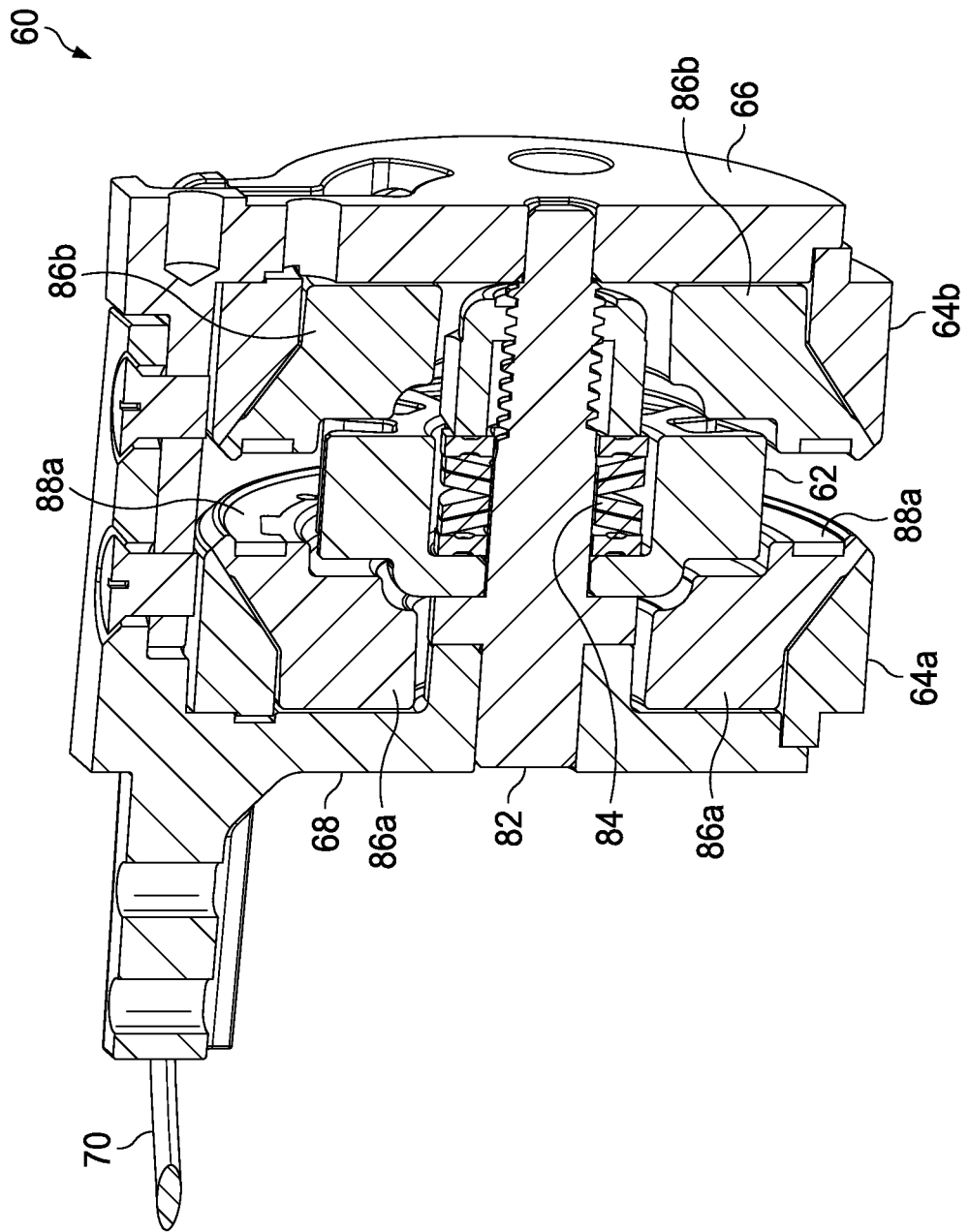
FIG. 11 is a simplified schematic diagram illustrating an orthographic cutaway view of a portion of an electronic device, in accordance with one example implementation.

Turning to FIG. 10, FIG. 10 is a simplified schematic diagram illustrating an orthographic view of a portion of second housing 14b in accordance with one example implementation. Second housing 14b can include a pin hinge channel 72. Pin hinge channel 72 can include a tooth 74, pin contact 76, magnet strip 78a and b, and electrical leads 80. Pin contact 76 can provide an electrical contact between first housing 12 and second housing 14b Turning to FIG. 11, FIG. 11 is a simplified schematic diagram illustrating a cutaway view of a pin contact disk 60 in accordance with one example implementation. Pin contact disk 60 can include second sprocket 62, second magnetic ring 64a and b, first housing 66, second housing 68, threaded shaft 82, tension mechanism 84, contact ring housing 86a and b, and contact ring 88a and b. Pin contact disk 60 and pin contact 76 can be electrically connected and used to pass electrical signals from first housing 12 to second housing 14b.

Figure 12:
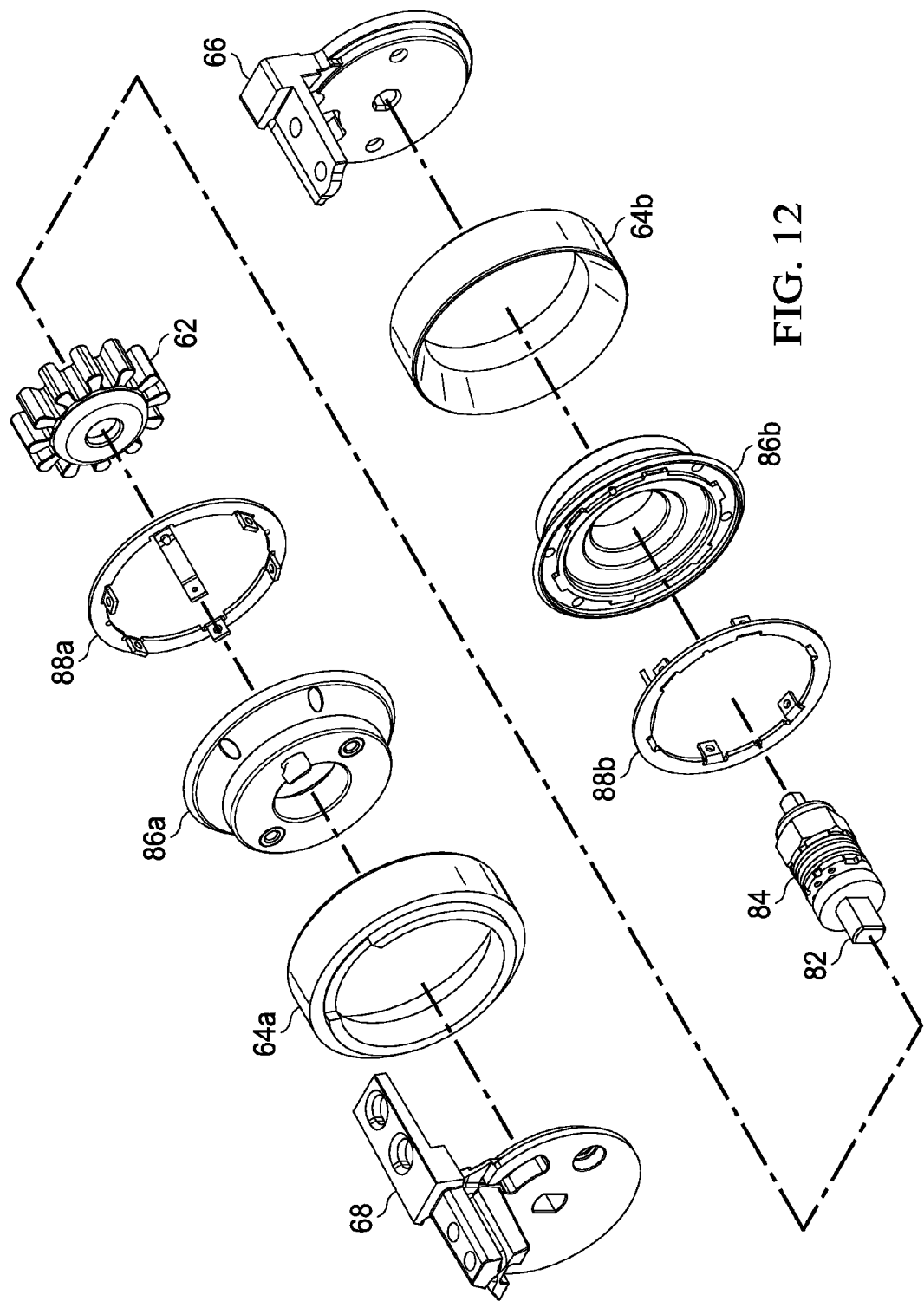
FIG. 12 is a simplified schematic diagram illustrating an exploded view of a portion of an electronic device, in accordance with one example implementation.

Turning to FIG. 12, FIG. 12 is a simplified schematic diagram illustrating an exploded view of a pin contact disk 60 in accordance with one example implementation. Pin contact disk 60 can include sprocket 62, second magnetic rings 64a and b, first housing 66, second housing 68, threaded shaft 82, tension mechanism 84, contact ring housing 86a and b, and contact ring 88a and b. Contact ring housing 86a and b can be comprised of an inert material that provides insulating properties. Contact ring 88a and b can be comprised of a conductive material that allows electricity to flow through contact ring 88a and b.

Figure 13:
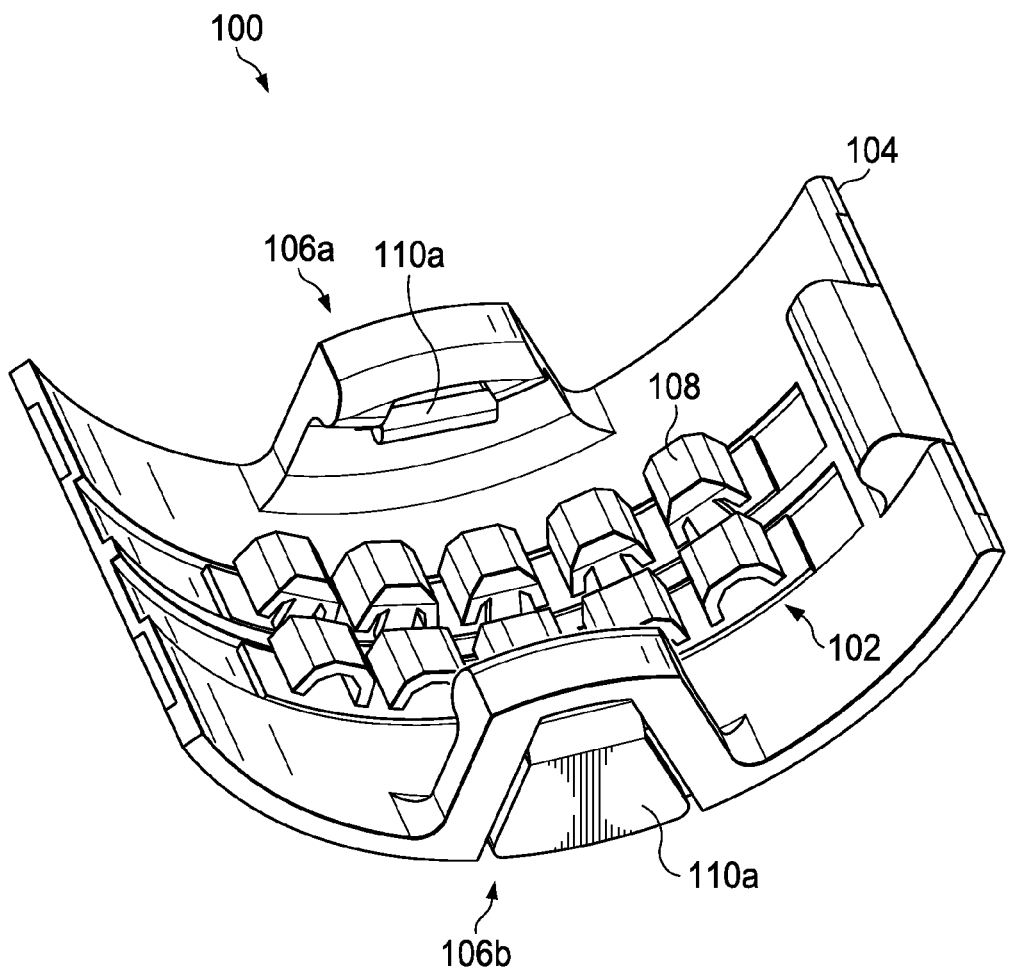
FIG. 13 is a simplified schematic diagram illustrating an orthographic view of a portion of an accessory of an electronic device, in accordance with one example implementation.

Turning to FIG. 13, FIG. 13 is a simplified schematic diagram illustrating an orthographic view of a mechanical disk grove 100 in accordance with one example implementation. Mechanical disk groove 100 may be located in hinge channel 24 similar to disk groove 32 as illustrated in FIGS. 2 and 3. Mechanical disk groove 100 can include mechanical attachment snap band 102, cradle 104, and disk retention arms 106a and b. Mechanical attachment snap band 102 can include attachment teeth 108. Disk retention arms 106a and b can include arm contacts 110a and b respectively. Mechanical attachment snap band 102, attachment teeth 108, and arm contacts 110a and b can include conductive material to allow power and electrical signals to flow between first housing 12 and a device (e.g., second housing 14a) that includes hinge channel 24. Cradle and disk retention arms 106a and b can include insulating material (e.g., plastic), to insulate mechanical disk groove 100. Attachment teeth 108 can be configured to mechanically retain a mechanical retention disk.

Figure 14:
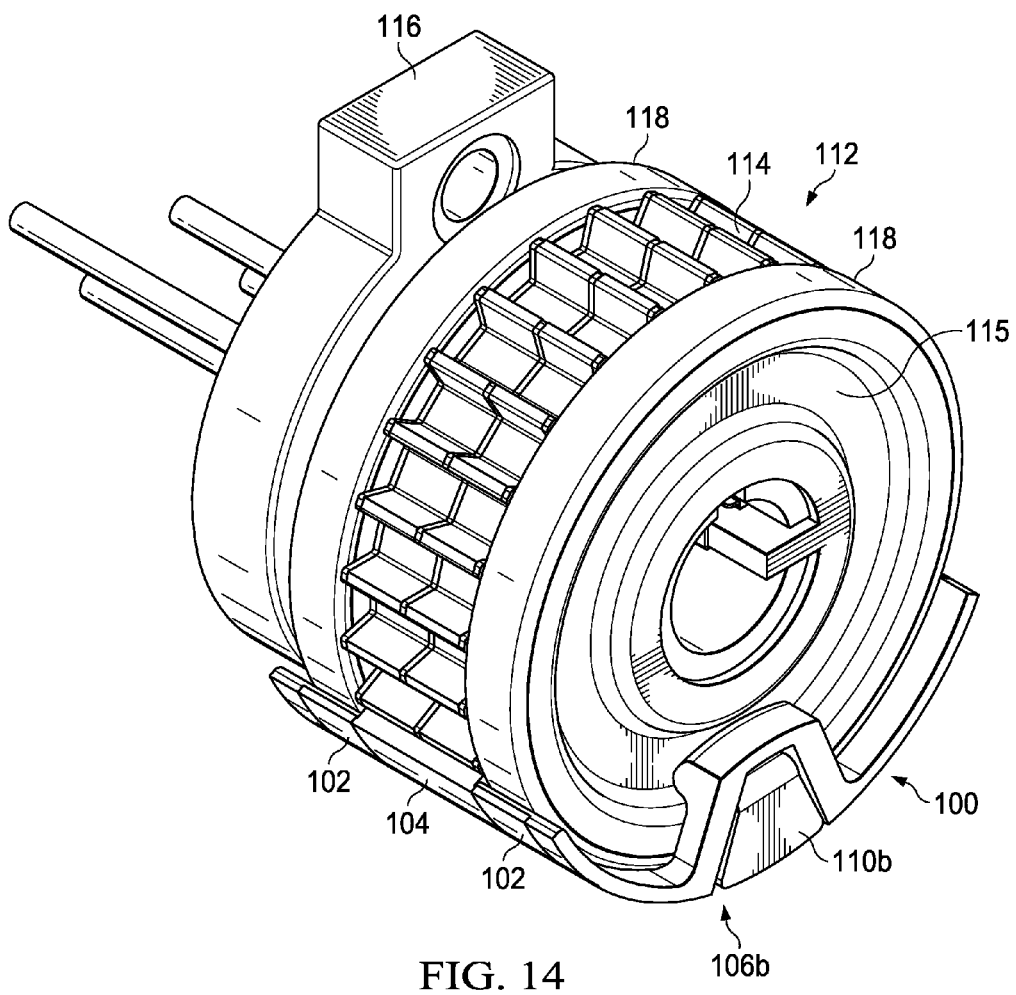
FIG. 14 is a simplified schematic diagram illustrating an orthographic view of a portion of an electronic device, in accordance with one example implementation.

Turning to FIG. 14, FIG. 14 is a simplified schematic diagram illustrating an orthographic view of a mechanical retention disk 112 coupled to mechanical disk grove 100 in accordance with one example implementation. Mechanical retention disk 112 can include attachment teeth slots 114, conductive disks 115, first housing attachment plate 116, and support rings 118. Attachment teeth slots 114 can be configured to accommodate attachment teeth 108 on mechanical attachment snap band 102. First housing attachment plate 116 can allow for mechanical retention disk 112 to be secured or coupled to first housing 12. In an embodiment, mechanical retention disk 112 may be secured or coupled to first housing 12 and mechanical disk groove 100 may be secured or coupled to a device (e.g., second housing 14a) that includes hinge channel 24. This can allow first housing 12 to be inserted into hinge channel 24 and, provide a uniform resistance to motion. Attachment teeth slots 114 and conductive disks 115 can include conductive material to allow power and electrical signals to flow from first housing 12 and the device that includes hinge channel 24 when connected. For example, power and electrical signals may flow from the device to mechanical attachment snap band 102, through attachment teeth 108 to attachment teeth slots 114, and to mechanical retention disk 112. In another example, power and electrical signals may flow from second housing 14a, through arm contacts 110a and b and to conductive disks 115, which are in contact with arm contacts 110a and b.

Figure 15:
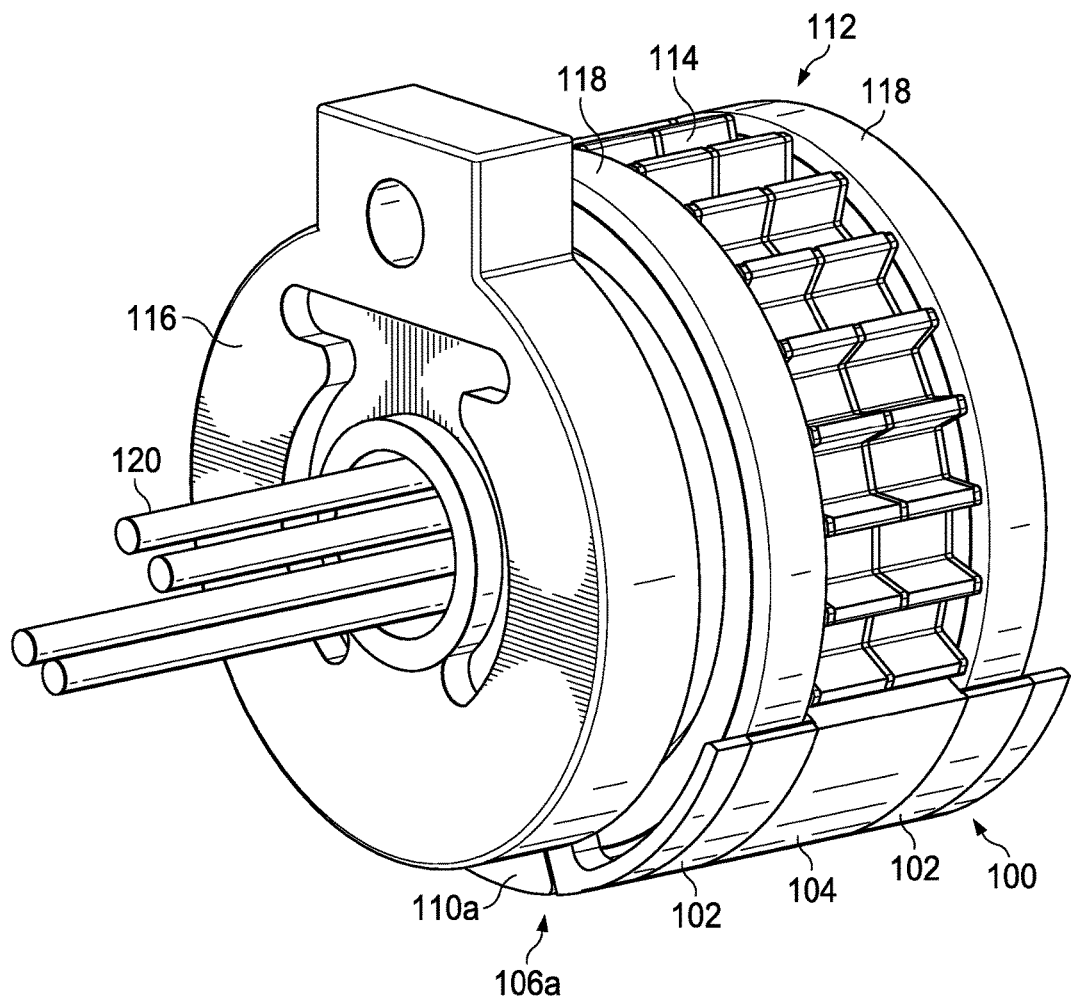
FIG. 15 is a simplified schematic diagram illustrating an orthographic view of a portion of an electronic device, in accordance with one example implementation.

Turning to FIG. 15, FIG. 15 is a simplified schematic diagram illustrating an orthographic view of a mechanical retention disk 112 coupled to mechanical disk grove 100 in accordance with one example implementation. Mechanical retention disk 112 can include one or more electrical wires 120. One or more electrical wires 120 can be coupled to attachment teeth slots 114 and to conductive disks 115 to allow power and electrical signals to flow to and from first housing 12 and a device that includes hinge channel 24.

In certain embodiments, the clutch mechanism (e.g., torque engine 42) does not have to be internal to the first housing discs (e.g., they can be in the area occupied by batteries). In essence, any clutch mechanism can be used in order to accommodate the teachings of the present disclosure. Additionally, friction forces do not have to be equal in both directions in certain embodiments of the present disclosure.

For the actual assembly, one of the two ferrous steel bands can be assembled with the torque insert and then inserted into the first housing by sliding it into the center barrel section with the second ferrous steel band loosely present over the center-toothed disc, which has a smaller outer diameter than the inner diameter of the ferrous steel band. Subsequently, the connector sub-assembly can be pushed in from the outside through the outer portion of the first housing barrel and the second ferrous steel band can be secured onto it.

Figure 16:
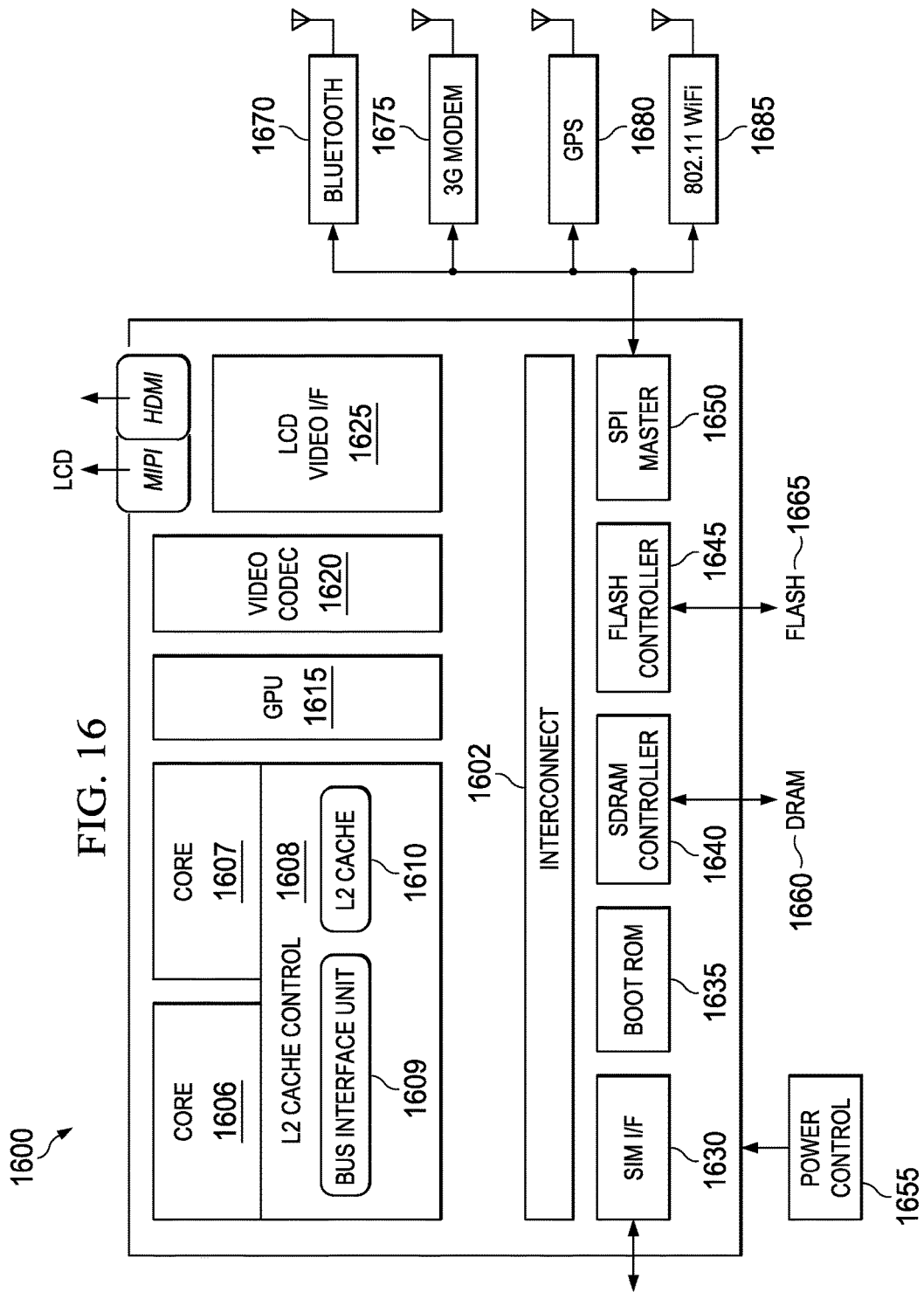
FIG. 16 is a simplified block diagram associated with an example ARM ecosystem system on chip (SOC) of the present disclosure.

Turning to FIG. 16, FIG. 16 is a simplified block diagram associated with an example ARM ecosystem SOC 1600 of the present disclosure. At least one example implementation of the present disclosure can include the hinge configuration features discussed herein and an ARM component. For example, the example of FIG. 16 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 16, ARM ecosystem SOC 1600 may include multiple cores 1606-1607, an L2 cache control 1608, a bus interface unit 1609, an L2 cache 1610, a graphics processing unit (GPU) 1615, an interconnect 1602, a video codec 1620, and a liquid crystal display (LCD) I/F 1625, which may be associated with mobile industry processor interface (MIPI)/high-definition multimedia interface (HDMI) links that couple to an LCD.

ARM ecosystem SOC 1600 may also include a subscriber identity module (SIM) I/F 1630, a boot read-only memory (ROM) 1635, a synchronous dynamic random access memory (SDRAM) controller 1640, a flash controller 1645, a serial peripheral interface (SPI) master 1650, a suitable power control 1655, a dynamic RAM (DRAM) 1660, and flash 1665. In addition, one or more example embodiments include one or more communication capabilities, interfaces, and features such as instances of Bluetooth™ 1670, a 3G modem 1675, a global positioning system (GPS) 1680, and an 802.11 WiFi 1685.

In operation, the example of FIG. 16 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 17:
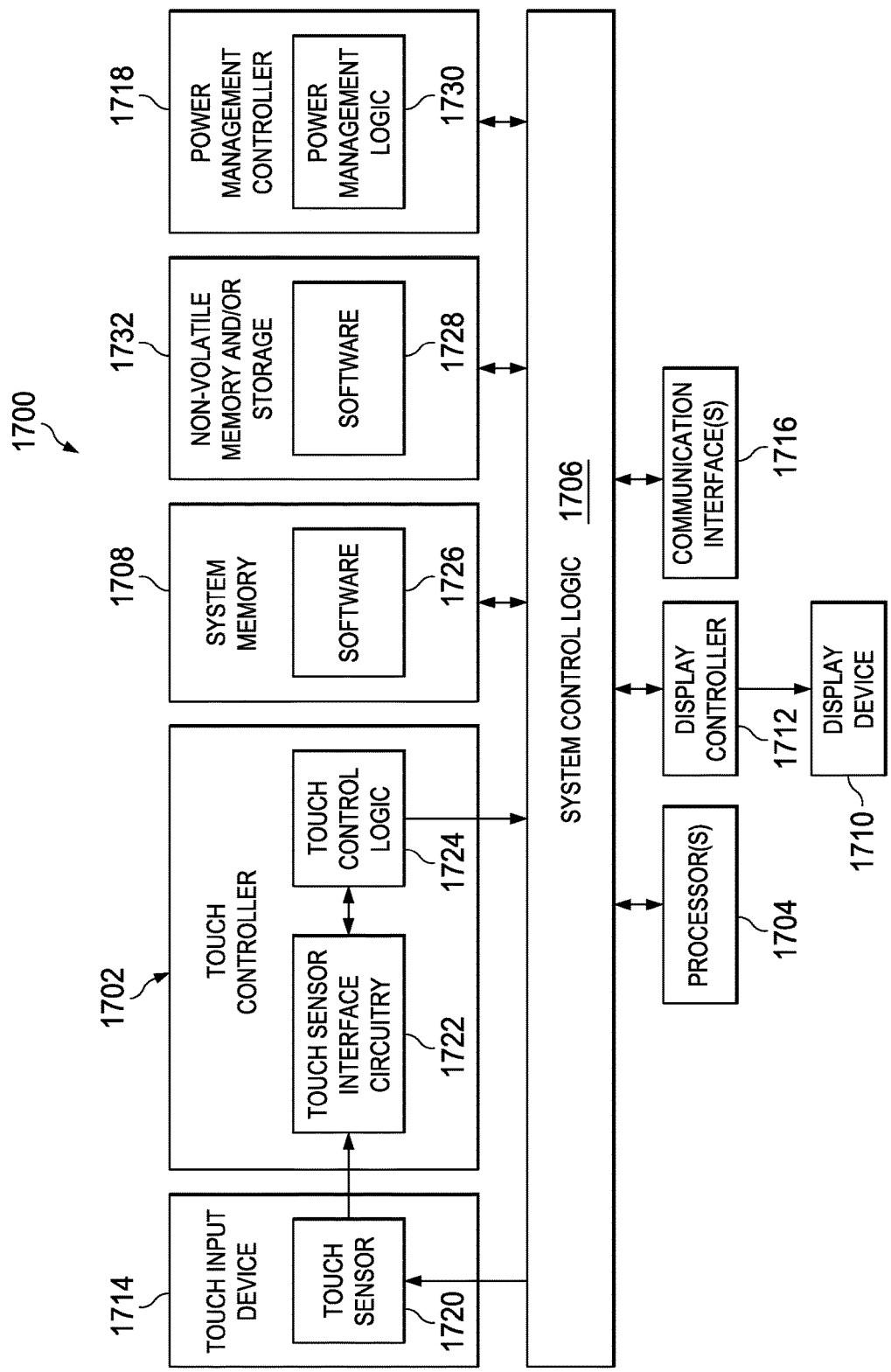
FIG. 17 is a simplified block diagram illustrating example logic that may be used to execute activities associated with the present disclosure.

Turning to FIG. 17, FIG. 17 is a simplified block diagram illustrating potential electronics and logic that may be associated with the electronic devices discussed herein. In at least one example embodiment, system 1700 can include a touch controller 1702, one or more processors 1704, system control logic 1706 coupled to at least one of processor(s) 1704, system memory 1708 coupled to system control logic 1706, non-volatile memory and/or storage device(s) 1732 coupled to system control logic 1706, display controller 1712 coupled to system control logic 1706, display controller 1712 coupled to a display device 1710, power management controller 1718 coupled to system control logic 1706, and/or communication interfaces 1716 coupled to system control logic 1706.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 1700 is part of a more generalized enclosure. In alternate implementations, instead of notebook device/laptops, etc., certain alternate embodiments deal with mobile phones, tablet devices, etc.

System control logic 1706, in at least one embodiment, can include any suitable interface controllers to provide for any suitable interface to at least one processor 1704 and/or to any suitable device or component in communication with system control logic 1706. System control logic 1706, in at least one embodiment, can include one or more memory controllers to provide an interface to system memory 1708. System memory 1708 may be used to load and store data and/or instructions, for example, for system 1700. System memory 1708, in at least one embodiment, can include any suitable volatile memory, such as suitable dynamic random access memory (DRAM) for example. System control logic 1706, in at least one embodiment, can include one or more I/O controllers to provide an interface to display device 1710, touch controller 1702, and non-volatile memory and/or storage device(s) 1732.

Non-volatile memory and/or storage device(s) 1732 may be used to store data and/or instructions, for example within software 1728. Non-volatile memory and/or storage device(s) 1732 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1718 may include power management logic 1730 configured to control various power management and/or power saving functions. In at least one example embodiment, power management controller 1718 is configured to reduce the power consumption of components or devices of system 1700 that may either be operated at reduced power or turned off when the electronic device is in a closed configuration. For example, in at least one embodiment, when the electronic device is in a closed configuration, power management controller 1718 performs one or more of the following: power down the unused portion of the display and/or any backlight associated therewith; allow one or more of processor(s) 1704 to go to a lower power state if less computing power is required in the closed configuration; and shutdown any devices and/or components that are unused when an electronic device is in the closed configuration.

Communications interface(s) 1716 may provide an interface for system 1700 to communicate over one or more networks and/or with any other suitable device. Communications interface(s) 1716 may include any suitable hardware and/or firmware. Communications interface(s) 1716, in at least one example embodiment, may include, for example, a network adapter, a wireless network adapter, a telephone modem, and/or a wireless modem. System control logic 1706, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 1704 may be packaged together with logic for one or more controllers of system control logic 1706. In at least one embodiment, at least one processor 1704 may be packaged together with logic for one or more controllers of system control logic 1706 to form a System in Package (SiP). In at least one embodiment, at least one processor 1704 may be integrated on the same die with logic for one or more controllers of system control logic 1706. For at least one embodiment, at least one processor 1704 may be integrated on the same die with logic for one or more controllers of system control logic 1706 to form a System on Chip (SoC).

For touch control, touch controller 1702 may include touch sensor interface circuitry 1722 and touch control logic

1724. Touch sensor interface circuitry 1722 may be coupled to detect, using a touch sensor 1720, touch input over a first touch surface layer and a second touch surface layer of a display (i.e., display device 1710). Touch sensor interface circuitry 1722 may include any suitable circuitry that may depend, for example, at least in part on the touch-sensitive technology used for a touch input device 1714. Touch sensor interface circuitry 1722, in one embodiment, may support any suitable multi-touch technology. Touch sensor interface circuitry 1722, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1724 may be coupled to help control touch sensor interface circuitry 1722 in any suitable manner to detect touch input over a first touch surface layer and a second touch surface layer. Touch control logic 1724 for at least one example embodiment may also be coupled to output in any suitable manner digital touch input data corresponding to touch input detected by touch sensor interface circuitry 1722. Touch control logic 1724 may be implemented using any suitable logic, including any suitable hardware, firmware, and/or software logic (e.g., non-transitory tangible media), that may depend, for example, at least in part on the circuitry used for touch sensor interface circuitry 1722. Touch control logic 1724 for at least one embodiment may support any suitable multi-touch technology.

Touch control logic 1724 may be coupled to output digital touch input data to system control logic 1706 and/or at least one processor 1704 for processing. At least one processor 1704 for at least one embodiment may execute any suitable software to process digital touch input data output from touch control logic 1724. Suitable software may include, for example, any suitable driver software and/or any suitable application software. As illustrated in FIG. 17, system memory 1708 may store suitable software 1726 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation may include means for receiving a plurality of second housings at an electronic device that includes a plurality of discs provided as part of a hinge assembly. The implementation may also include means for engaging the hinge assembly with the second housing to secure a first housing of the electronic device to the second housing, wherein the hinge assembly is to allow for electrical signals and data to pass between the first housing and the second housing and for a rotation of the first housing in relation to the second housing. The actual hinge assembly may include a disc-toothed wheel to receive the plurality of segments of the second housing in order to secure the first housing to the second housing. In addition, the second housing may include a tooth segment to provide an alignment function as the hinge assembly engages the second housing. Additionally, the second housing may include one or more magnetic bands that attract one or more rings provided in the first housing.

Other Notes and Examples

Example A1 is an electronic device that includes a first housing and a hinge assembly on the first housing to removably secure the first housing to a second housing. The hinge assembly is to allow a rotation of the first housing in relation to the second housing. The hinge assembly can include at least one disc to receive at least one segment of the second housing as the hinge assembly is engaged to secure the first housing to the second housing and at least one electrical connection that electrically connects the first housing and the second housing.

In Example A2, the subject matter of Example A1 may optionally include where the hinge assembly includes a disc-toothed wheel to receive the at least one segment of the second housing.

In Example A3, the subject matter of any of the preceding 'A' Examples can optionally include where the at least one segment is to provide an alignment function as the hinge assembly is to engage the second housing.

In Example A4, the subject matter of any of the preceding 'A' Examples can optionally include where the at least one electrical connection is a conductive ring.

In Example A5, the subject matter of any of the preceding 'A' Examples can optionally include where the second housing includes a spring contact that connects to the conductive ring and electrically connect the first housing and the second housing.

In Example A6, the subject matter of any of the preceding 'A' Examples can optionally include where the second housing includes a pin contact that connects to the conductive ring and electrically connect the first housing and the second housing.

In Example A7, the subject matter of any of the preceding 'A' Examples can optionally include where the second housing includes a portion of a ferrous housing to reduce one or more stray magnetic fields.

In Example A8, the subject matter of any of the preceding 'A' Examples can optionally include where the second housing includes one or more rare earth magnets to attract one or more discs of the electronic device.

In Example A9, the subject matter of any of the preceding 'A' Examples can optionally include where the at least one segment includes a center tooth to mate with a toothed disc of the electronic device to resist rotation between the first housing and the second housing.

In Example A10, the subject matter of any of the preceding 'A' Examples can optionally include where the first housing includes a touch display.

In Example A11, the subject matter of any of the preceding 'A' Examples can optionally include where the second housing includes attachment teeth to mechanically and electrically couple to the first housing.

In Example A12, the subject matter of any of the preceding 'A' Examples can optionally include where the second housing is a keyboard.

In Example A13, the subject matter of any of the preceding 'A' Examples can optionally include where the first housing is a standalone table.

In Example A14, the subject matter of any of the preceding 'A' Examples can optionally include where the hinge assembly is to provide a range of rotation to the first housing relative to the second housing, the range of rotation extending from 0° in a closed position to 150° in a substantially open position.

In Example A15, the subject matter of any of the preceding 'A' Examples can optionally include where power and data are to flow between the first housing and the second housing.

In Example A16, the subject matter of any of the preceding 'A' Examples can optionally include where the second housing includes an arced cavity to receive the hinge assembly, which is substantially cylindrically shaped.

In Example A17, the subject matter of any of the preceding 'A' Examples can optionally include where power and electrical signals are to pass through a plurality of discs via contacts associated with the second housing.

Example M1 is a method that includes receiving at least one segment of an accessory at an electronic device that includes at least one disc provided as part of a hinge assembly and engaging the hinge assembly with the accessory to secure a portion of the electronic device to the accessory, where the hinge assembly is to allow for electrical signals between the accessory and the electronic device and to allow for a rotation of the portion in relation to the accessory.

In Example M2, the subject matter of any of the preceding 'M' Examples can optionally include where the hinge assembly includes a disc-toothed wheel to receive the at least one segment of the accessory.

In Example M3, the subject matter of any of the preceding 'M' Examples can optionally include where the at least one segment is to provide an alignment function as the hinge assembly is to engage the accessory.

In Example M4, the subject matter of any of the preceding 'M' Examples can optionally include where the hinge assembly includes at least one conductive ring to carry the electrical signals between the accessory and the electronic device.

In Example M5, the subject matter of any of the preceding 'M' Examples can optionally include where the accessory includes a pin contact that connects to a conductive ring in the hinge assembly to carry the electrical signals between the accessory and the electronic device.

In Example M6, the subject matter of any of the preceding 'M' Examples can optionally include where the accessory includes one or more rare earth magnets to attract one or more discs of the electronic device.

In Example M7, the subject matter of any of the preceding 'M' Examples can optionally include where the at least one segment includes a center tooth to mate with a toothed disc of the electronic device to resist rotation between the portion and the accessory.

In Example M8, the subject matter of any of the preceding 'M' Examples can optionally include where the hinge assembly is to provide a range of rotation to the electronic device relative to the accessory, the range of rotation extending from 0° in a closed position to 150° in a substantially open position.

In Example M9, the subject matter of any of the preceding 'M' Examples can optionally include where the accessory includes an arced cavity to receive the hinge assembly, which is substantially cylindrically shaped.

In Example M10, the subject matter of any of the preceding 'M' Examples can optionally include where power and data are to flow between the accessory and the portion.

In Example M11, the subject matter of any of the preceding 'M' Examples can optionally include where power signals are to pass through a plurality of discs via contacts associated with the accessory.

An example system S1 can include a hinge assembly to selectively secure a portion of the electronic device to an accessory. The hinge assembly is to allow a rotation of the portion in relation to the accessory. The hinge assembly can include a sprocket, and at least one conductive ring to allow electrical signals to pass between the electronic device and the accessory.

An example system S2 can include where the conductive ring is a ferromagnetic ring.

In Example S3, the subject matter of any of the preceding 'SS' Examples can optionally include where the accessory includes a spring contact that connects to the ferromagnetic ring and electrically connects the electronic device and the accessory.

In Example S4, the subject matter of any of the preceding 'SS' Examples can optionally include where a pin contact that connects to the conductive ring and electrically connects the electronic device and the accessory.

In Example S5, the subject matter of any of the preceding 'SS' Examples can optionally include where the accessory includes a portion of a ferrous housing to reduce one or more stray magnetic fields.

In Example S6, the subject matter of any of the preceding 'S' Examples can optionally include where the first element is an input device of an electronic device and the second element is a display portion of the electronic device.

Example X1 is a machine-readable storage medium including machine-readable instructions to implement a method or realize an apparatus as in any one of the Examples A1-A17, and M1-M11. Example Y1 is an apparatus comprising means for performing of any of the Example methods M1-M11. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
    a first housing; and
    a hinge assembly on the first housing to removably secure the first housing to a second housing, wherein the hinge assembly is to allow a rotation of the first housing in relation to the second housing, and wherein the hinge assembly includes:
        at least one disc to receive at least one segment of the second housing as the hinge assembly is engaged to secure the first housing to the second housing;
        at least one conductive ring that electrically connects to a corresponding second housing contact spring on the second housing, wherein the conductive ring and the second housing contact spring allow for a rotatable electric connection between the first housing and the second housing;
        a first spring contact that is electrically coupled to the at least one conductive ring;
        a lock housing, wherein the lock housing includes a first connecting contact electrically coupled to the first spring contact; and
        a first housing connection electrically coupled to the first connecting contact and to the first housing such that an electrical signal can pass from the second housing, through the second housing contact spring, through the at least one conductive ring, through the first spring contact, through the first connecting contact, through the first housing connection, and to the first housing.

2. The electronic device of claim 1, wherein the hinge assembly includes a disc-toothed wheel to receive the at least one segment of the second housing.

3. The electronic device of claim 1, wherein the at least one segment is to provide an alignment function as the hinge assembly is to engage the second housing.

4. The electronic device of claim 1, wherein the at least one conductive ring is a ferromagnetic ring.

5. The electronic device of claim 4, wherein the spring contact electrically couples to the ferromagnetic ring.

6. The electronic device of claim 4, wherein the second housing includes two contact springs that electrically couple to two ferromagnetic magnetic rings and rotatably electrically connect the first housing and the second housing.

7. The electronic device of claim 1, wherein the second housing includes a portion of a ferrous housing to reduce one or more stray magnetic fields.

8. The electronic device of claim 1, wherein the second housing includes one or more rare earth magnets to attract one or more discs of the electronic device.

9. The electronic device of claim 1, wherein the at least one segment includes a center tooth to mate with a toothed disc of the electronic device to resist rotation between the first housing and the second housing.

10. The electronic device of claim 1, wherein the first housing includes a touch display.

11. The electronic device of claim 1, wherein the second housing includes attachment teeth to mechanically and electrically couple to the first housing.

12. The electronic device of claim 1, wherein the second housing is a keyboard.

13. The electronic device of claim 1, wherein the first housing is a standalone table.

14. The electronic device of claim 1, wherein the hinge assembly is to provide a range of rotation to the first housing relative to the second housing, the range of rotation extending from 0° in a closed position to 150° in a substantially open position.

15. The electronic device of claim 1, wherein power and data are to flow between the first housing and the second housing.

16. The electronic device of claim 1, wherein the second housing includes an arced cavity to receive the hinge assembly, which is substantially cylindrically shaped.

17. The electronic device of claim 1, wherein power and electrical signals are to pass through the at least one conductive ring and the corresponding contact spring.

18. A method, comprising:
    receiving at least one segment of an accessory at an electronic device, wherein the electronic device includes:
        at least one disc;
        at least one conductive ring provided as part of a hinge assembly;
        a first spring contact that is electrically coupled to the at least one conductive ring;
        a lock housing, wherein the lock housing includes a first connecting contact electrically coupled to the first spring contact; and
        a first housing connection electrically coupled to the first connecting contact and to at least one electronic element in the electronic device; and
    engaging the hinge assembly with the accessory to secure a portion of the electronic device to the accessory, wherein the accessory includes an accessory contact spring that corresponds to the at least one conductive ring and allows for a rotatable electric connection between the at least one conductive ring and the accessory contact spring, wherein the hinge assembly is to allow for electrical signals between the accessory and the electronic device such that an electrical signal can pass from the accessory, through the accessory contact spring, through the at least one conductive ring, through the first spring contact, through the first connecting contact, through the first housing connection, and to the at least one electronic element and to allow for a rotation of the portion in relation to the accessory.

19. The method of claim 18, wherein the hinge assembly includes a disc-toothed wheel to receive the at least one segment of the accessory.

20. The method of claim 18, wherein the at least one conductive ring is a ferromagnetic ring to carry the electrical signals between the accessory and the electronic device.

21. The method of claim 18, wherein the accessory includes two contact springs that connect to a two ferromagnetic magnetic rings in the hinge assembly to carry the electrical signals between the accessory and the electronic device.

22. The method of claim 18, wherein power and data are to flow between the accessory and the electronic device.

23. A system, comprising:
   a hinge assembly to selectively secure a portion of the electronic device to an accessory, wherein the hinge assembly is to allow a rotation of the electronic device in relation to the accessory, and wherein the hinge assembly includes:
      a sprocket;
      at least one conductive ring that electrically connects to a corresponding accessory contact spring on the accessory, wherein the conductive ring and the accessory contact spring allow for a rotatable electric connection to allow electrical signals to pass between the electronic device and the accessory;
      a first spring contact that is electrically coupled to the at least one conductive ring; and
   a lock housing, wherein the lock housing includes a first connecting contact electrically coupled to the first spring contact; and
   a first housing connection electrically coupled to the first connecting contact and to an electronic element in the electronic device such that an electrical signal can pass from the accessory, through the accessory contact spring, through the at least one conductive ring, through the first spring contact, through the first connecting contact, through the first housing connection, and to the electronic element.

24. The system of claim 23, wherein the at least one conductive ring is two ferromagnetic rings.

25. The system of claim 24, wherein the accessory includes two spring contacts that connect to the ferromagnetic rings and electrically connects the electronic device and the accessory.

26. The system of claim 23, wherein the accessory includes a portion of a ferrous housing to reduce one or more stray magnetic fields.

* * * * *